United States Patent
Ono

(10) Patent No.: US 8,634,692 B2
(45) Date of Patent: Jan. 21, 2014

(54) IMAGE RECORDING/REPRODUCING APPARATUS, CONTROL METHOD THEREOF, PROGRAM AND STORAGE MEDIUM

(75) Inventor: Tachio Ono, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1407 days.

(21) Appl. No.: 11/782,900

(22) Filed: Jul. 25, 2007

(65) Prior Publication Data

US 2008/0025708 A1    Jan. 31, 2008

(30) Foreign Application Priority Data

Jul. 26, 2006  (JP) ................................. 2006-203544

(51) Int. Cl.
| | | |
|---|---|---|
| H04N 5/935 | (2006.01) | |
| H04N 5/77 | (2006.01) | |
| H04N 9/80 | (2006.01) | |
| G06F 12/00 | (2006.01) | |
| G06F 17/30 | (2006.01) | |

(52) U.S. Cl.
USPC ........... 386/200; 386/210; 386/224; 386/239; 386/248; 707/821; 707/822; 707/823; 707/828; 707/829

(58) Field of Classification Search
USPC ................. 386/200, 224, 326, 210, 239–248; 707/821–831
See application file for complete search history.

(56) References Cited

U.S. PATENT DOCUMENTS

| | | | |
|---|---|---|---|
| 5,561,799 A | 10/1996 | Khalidi et al. | |
| 7,653,796 B2 * | 1/2010 | Inoue et al. | 711/170 |
| 7,930,480 B2 * | 4/2011 | Yamada | 711/118 |
| 2002/0154337 A1 | 10/2002 | Sakata | |
| 2003/0081938 A1 * | 5/2003 | Nishimura et al. | 386/52 |
| 2004/0177229 A1 * | 9/2004 | March et al. | 711/173 |
| 2004/0267777 A1 | 12/2004 | Sugimura et al. | |
| 2005/0021493 A1 * | 1/2005 | Hoshizawa et al. | 707/1 |
| 2005/0086294 A1 * | 4/2005 | Kodama | 709/203 |
| 2006/0224819 A1 * | 10/2006 | Ito | 711/103 |
| 2007/0094315 A1 * | 4/2007 | Seo et al. | 707/205 |
| 2007/0112820 A1 * | 5/2007 | Witt et al. | 707/101 |
| 2007/0198546 A1 * | 8/2007 | Shintani | 707/100 |

FOREIGN PATENT DOCUMENTS

| | | | | |
|---|---|---|---|---|
| JP | 07-013844 A | 1/1995 | | |
| JP | 2002-314905 | 10/2002 | | |
| JP | 2004-173000 | 6/2004 | | |
| JP | 2004-220696 A | 8/2004 | | |
| JP | 2005-011429 A | 1/2005 | | |
| JP | 2005-011430 A | 1/2005 | | |
| WO | WO 2004/075063 A1 * | 9/2004 | ............. | G06F 12/00 |

* cited by examiner

Primary Examiner — Hung Dang
(74) Attorney, Agent, or Firm — Cowan, Liebowitz & Latman, P.C.

(57) ABSTRACT

An image recording/reproducing apparatus capable of achieving data transfer with ease. The recording area of a recording medium is divided into at least one sub area including multiple types of file systems for management. A sub area to be accessed to external device is determined among the at least one sub area. A file system to be accessed to the external device is determined among the multiple types of file systems. The determining of the file system is performed by selecting the file system to be accessed among the file systems included in the determined sub area.

14 Claims, 22 Drawing Sheets

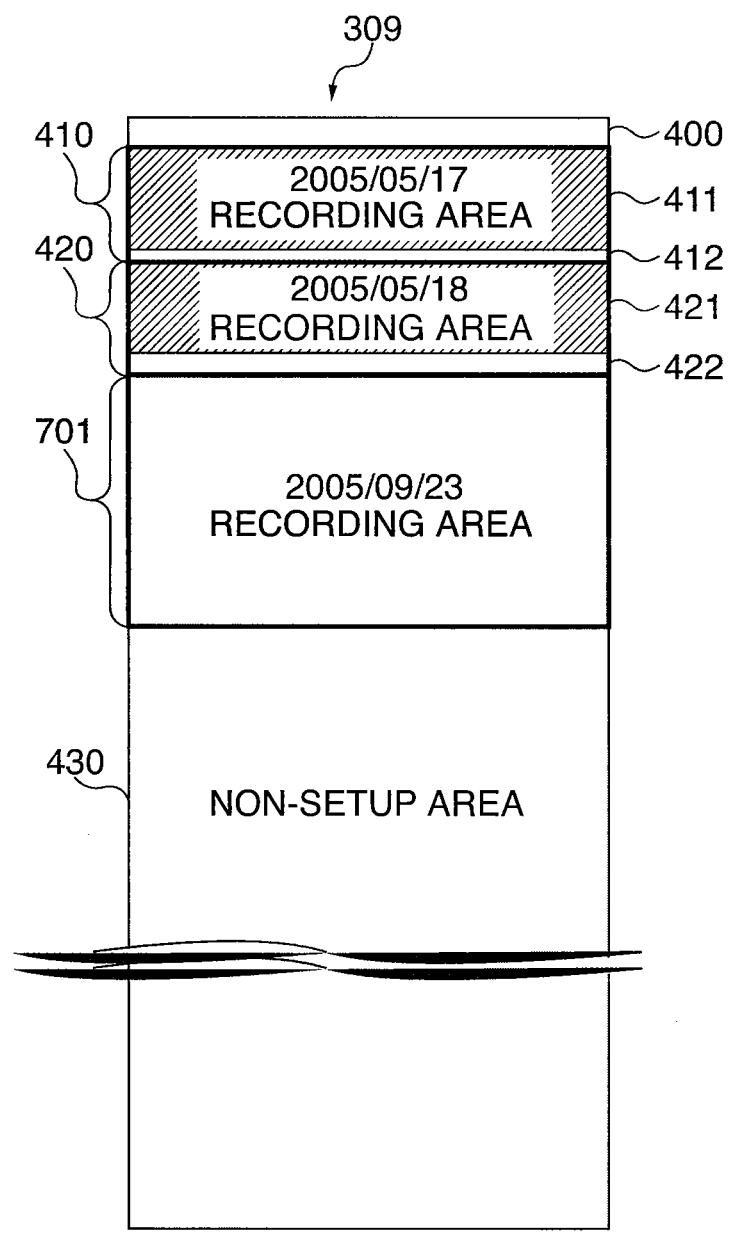

IMAGE RECORDING/REPRODUCING APPARATUS, CONTROL METHOD THEREOF, PROGRAM AND STORAGE MEDIUM

BACKGROUND OF THE INVENTION

1. Field of the Invention

The present invention relates to an image recording/reproducing apparatus, a control method thereof, a program and a storage medium, and more particularly, to an image recording/reproducing apparatus comprising a recording unit for recording input image data on a recording medium and a communication unit for connecting to external device and performing communication, a control method thereof, a program and a storage medium.

2. Description of the Related Art

Conventionally, when image data that has been recorded on an image recording/reproducing apparatus such as a digital video camera or a digital camera is saved, the recorded image data is transferred to a personal computer (hereinafter referred to as a "PC") or the like, and recorded on a large-capacity recording device such as a hard disk in the PC, or on a random access medium such as an optical disk.

When the PC is provided with a memory adapter, a user can mount on the memory adapter a recording medium that has been mounted on the image recording/reproducing apparatus, and transfer the image data recorded on the recording medium to the large-capacity recording device in the PC for storage. The recording media that can be mounted on the image recording/reproducing apparatuses include a compact flash (registered trademark), an SD card, a memory stick (registered trademark), a CD-R/RW and a DVD.

When the PC is not provided with a memory adapter, the PC and the image recording/reproducing apparatus are connected to each other through a digital interface, and the image data recorded on the recording medium in the image recording/reproducing apparatus is transferred to the large-capacity recording device in the PC for recording. The digital interfaces include a high-speed serial interface such as USB or IEEE 1394.

In either of these cases, a user uses an application software on the PC (hereinafter simply referred to as an "application") to instruct to perform data transfer from the recording medium on the side of the image recording/reproducing apparatus to the large-capacity recording device on the side of the PC, allowing data to be transferred and saved. In such a case, if the recording capacity of the large-capacity recording device on the side of the PC is sufficiently larger than that of the recording medium on the side of the image recording/reproducing apparatus, the user can transfer and save the image data into the large-capacity recording device on the side of the PC without concern for the size of the image data recorded on the recording medium of the image recording/reproducing apparatus.

However, if the capacity of the recording medium on the side of the image recording/reproducing apparatus becomes large, the user have to transfer and save the image data with concern for the difference between the capacity of the recording medium on the side of the image recording/reproducing apparatus and the capacity of the large-capacity recording device on the side of the PC. Further, if a recording medium to which the image data is to be transferred is a storage medium having a limited capacity such as a DVD, a CD-R and a CD-RW, the recording capacity of a transfer destination may be less than the size of the image data. In such a case, image data to be transferred has to be selected according to the recording capacity of the transfer destination, however, such tasks put a burden on the user.

As a method to solve this problem, a technique has been proposed whereby a recording area of the large-capacity recording medium on the side of the image recording/reproducing apparatus is divided according to the expected recording capacity of the transfer destination, so that a burden during a backup task by a user is reduced (see, e.g. Japanese Laid-Open Patent Publication (Kokai) No. 2002-314905, and Japanese Laid-Open Patent Publication (Kokai) No. 2004-173000).

An overview of an operation whereby image data recorded on a large-capacity recording medium in an image recording/reproducing apparatus is transferred to and recorded on a large-capacity recording device in a PC will now be described with reference to FIGS. 23 and 24.

In FIG. 23, a digital video camera 200 as an image recording/reproducing apparatus has a 1 terabyte (TM) large-capacity recording medium 201, and is connected to a PC 220 through a USB interface 210. The PC 220 is connected to a DVD drive 230.

When the digital video camera 200 is connected, the PC 220 recognizes the digital video camera 200 as an external recording device. In the large-capacity recording medium 201 of the digital video camera 200, the recording area is divided, and image data is recorded on each divided area (hereinafter referred to as a "folder").

In FIG. 24, a browser 240 is a screen displayed on a display 220a (FIG. 24) with which the PC 220 is provided by an application running on the PC 220. On a display area 250 on the browser 240, a list of recording devices connected to or built into the PC 220 including the DVD drive 230 is displayed. In the list on the display area 250, the digital video camera 200 is also displayed as one (icon 270) of the recording devices that are connected to the PC 220.

Furthermore, folders of each recording device can be displayed on the display area 250. Accordingly, on the display area 250, for example, as shown in FIG. 24, a plurality of folders that represent the divided recording areas of the large-capacity recording medium 201 are displayed. In addition, when one of the folders in the display area 250 is selected, a list of image data saved in the folder 280 that is being currently selected is displayed on a display area 260.

When the user instructs to select and transfer these image data as necessary, transfer from the digital video camera 200 to the PC 220 is started. The transferred data is written into a DVD, which is placed in the DVD drive 230, thus a backup task is achieved.

However, in a conventional image recording/reproducing apparatus like the above described digital video camera 200, if the number of sub areas displayed on the display area 250 in the list form is large, searching in the list for image data that the user wishes to back up becomes a cumbersome task for the user. The larger the capacity of the large-capacity recording medium 201, the more difficult this task of searching for the image data becomes.

SUMMARY OF THE INVENTION

The present invention has been made in the light of the above problem. The present invention provides an apparatus or the like that can easily achieve data transfer.

According to a first aspect of the present invention, there is provided an image recording apparatus adapted to record input image data on a recording medium, comprising a management unit adapted to divide the recording area of the recording medium into at least one sub area including multiple types of file systems for management, an area determination unit adapted to determine a sub area to be accessed to external device among the at least one sub area, and a file system determination unit adapted to determine a file system to be accessed to the external device among the multiple types of file systems, wherein the file system determination unit selects the file system to be accessed among the file systems included in the sub area determined by the area determination unit.

According to a second aspect of the present invention, there is provided a control method of an image recording apparatus adapted to record input image data on an recording medium, comprising the steps of dividing the recording area of the recording medium into at least one sub area including multiple types of file systems for management, determining a sub area to be accessed to external device among the at least one sub area, and determining a file system to be accessed to the external device among the multiple types of file systems, wherein the determining of the file system is performed by selecting the file system to be accessed among the file systems included in the determined sub area.

According to a third aspect of the present invention, there is provided a storage medium readable by a computer, the storage medium storing the control program.

The above and other objects, features, and advantages of the invention will become more apparent from the following detailed description taken in conjunction with the accompanying drawings.

BRIEF DESCRIPTION OF THE DRAWINGS

FIG. 6 is a diagram showing a recording area newly set on the recording medium.

DESCRIPTION OF THE EMBODIMENTS

The present invention will now be described in detail with reference to the drawings showing a preferred embodiment thereof. It should be noted that the relative arrangement of the components, the numerical expressions and numerical values set forth in the embodiment do not limit the scope of the present invention unless it is specifically stated otherwise.

The embodiments of the present invention will be described in details below with reference to the drawings.

Figure 1:
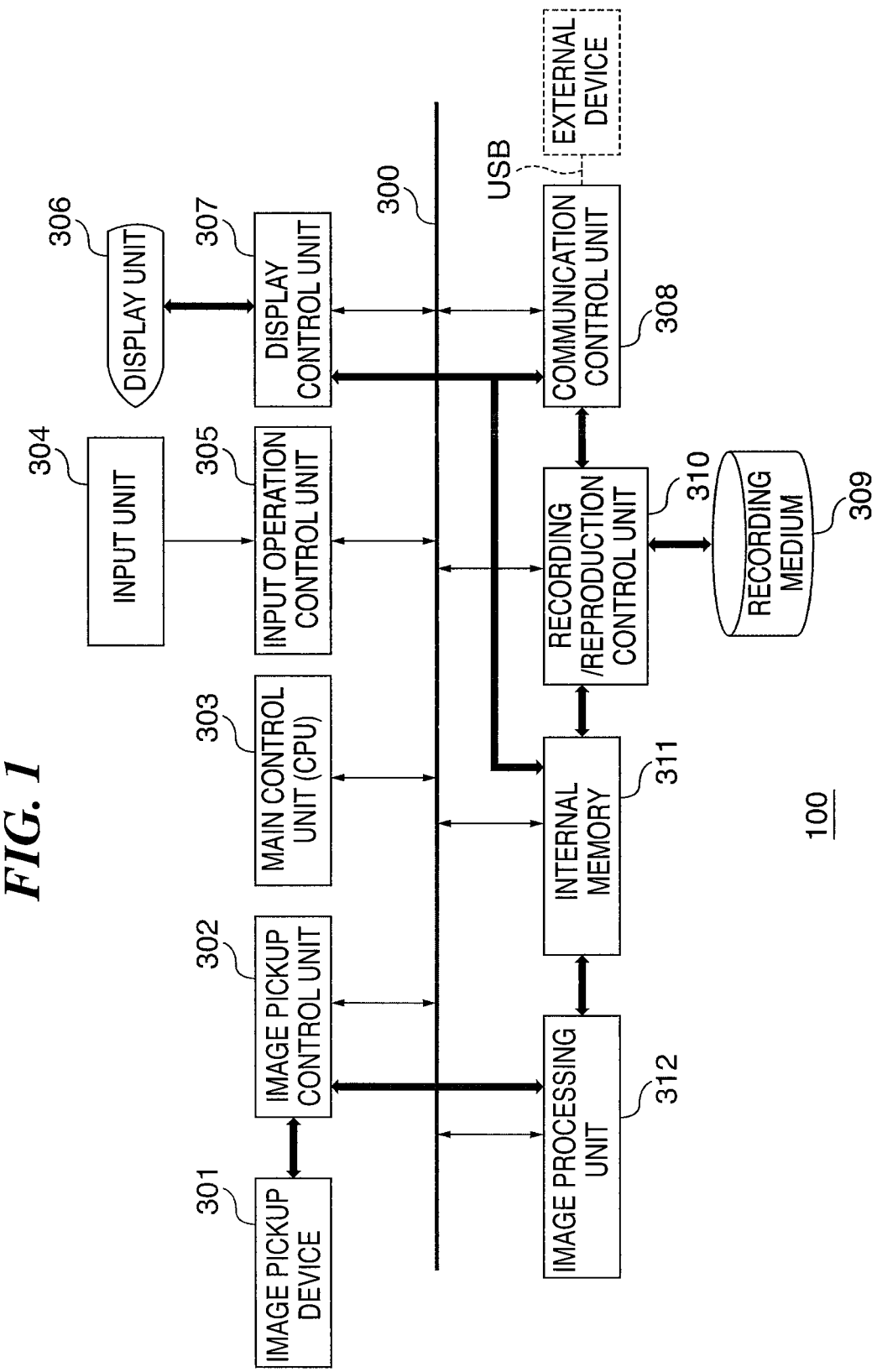
FIG. 1 is a block diagram showing the configuration of a digital video camera which is an example of an image recording/reproducing apparatus according to the present embodiment of the present invention.

FIG. 1 is a block diagram showing the configuration of a digital video camera which is an example of an image recording/reproducing apparatus according to the present embodiment.

In FIG. 1, a digital video camera 100 comprises an image pickup device 301, an image pickup control unit 302, a main control unit (CPU) 303, an input unit 304, an input operation control unit 305, a display unit 306, a display control unit 307 and a communication control unit 308. The digital camera 100 also comprises a recording medium 309, a recording/reproduction control unit 310, an internal memory 311 and an image processing unit 312.

Each control unit is controlled by the main control unit 303, which is connected through a main bus 300. Note that data is transferred between control units through the main bus 300, however, data may be transferred through buses other than the main bus 300.

In the digital video camera 100, image data is captured by the image pickup control unit 302 from the image pickup device 301, and the image is compressed by the image processing unit 312 and transferred to the recording/reproduction control unit 310 through the internal memory 311.

The recording/reproduction control unit 310 multiplexes the image data transferred and saved in the internal memory 311 with voice data or the like, and records the data on the recording medium 309 according to the recording format of the recording medium 309.

Meanwhile, the input unit 304 accepts operation from a user, the input operation control unit 305 notifies the main control unit 303 of the input information from the user, and the main control unit 303 determines the entire operation. For example, when the user uses the input unit 304 to instruct to start recording, a series of processes for recording image data on the recording medium 309 is started. Further, the information representing the operation status at that time is displayed on the display unit 306 by the display control unit 307.

The communication control unit 308 can be connected to external devices such as an external personal computer (hereinafter referred to as a "PC") through a USB interface. When an external device is connected to the USB interface, communication with the connected external device is immediately established, and data transfer or the like is achieved.

Next, the recording control method of the image data that is recorded on the recording medium 309 by the recording/reproduction control unit 310 of FIG. 1 will be described.

Figure 2:
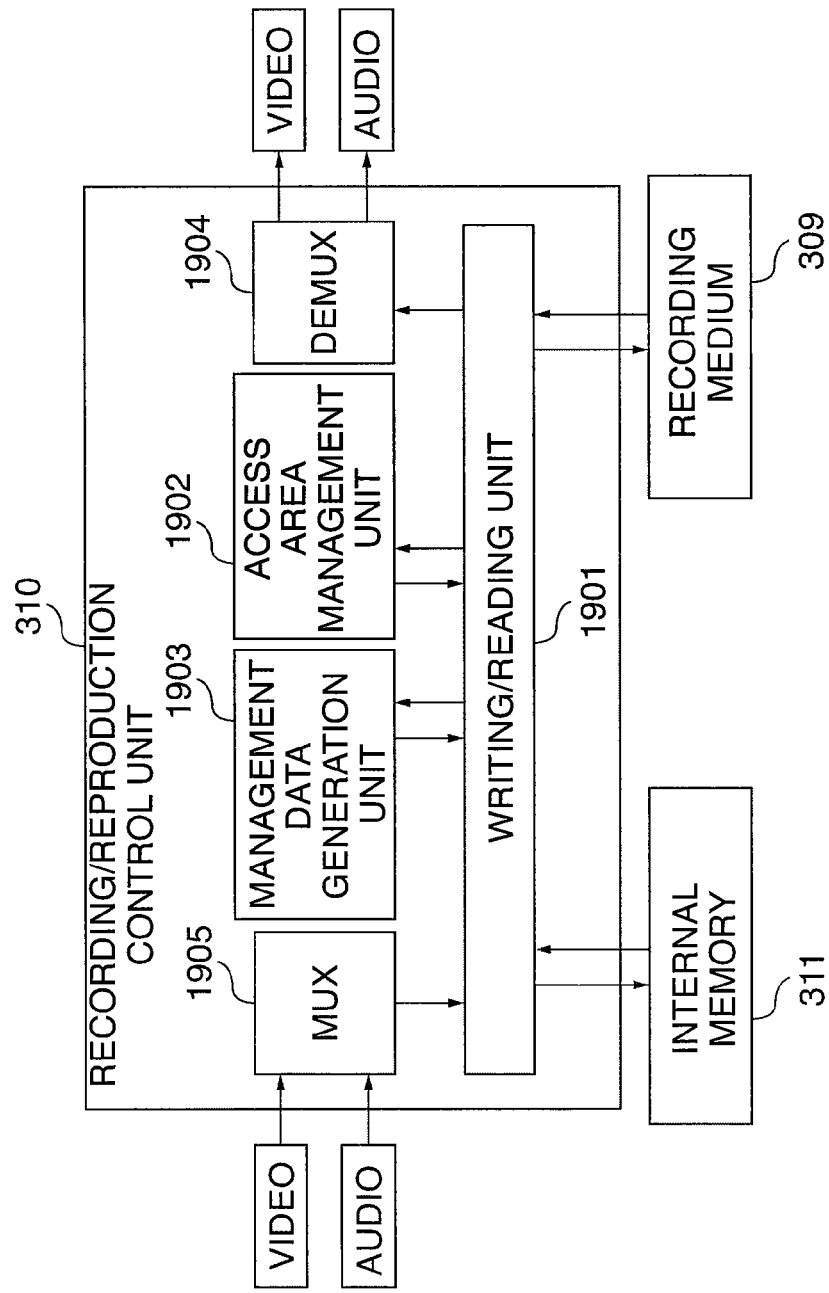
FIG. 2 is a block diagram showing the configuration of a recording/reproduction control unit in FIG. 1.

FIG. 2 is a block diagram showing the configuration of a recording/reproduction control unit 310 in FIG. 1.

In FIG. 2, an MUX 1905 multiplexes image data (VIDEO) read from the internal memory 311 with input voice data (AUDIO). The multiplexed data (image/voice multiplexed data is temporarily recorded on the internal memory 311, read from the internal memory 311 by a writing/reading unit 1901 and recorded on the recording medium 309. The recording position on the recording medium 309 of the image/voice multiplexed data is controlled and managed by an access area management unit 1902.

A management data generation unit 1903 generates management data for managing information on the image/voice multiplexed data recorded on the recording medium 309 and records the management data on the recording medium 309. A DEMUX 1904 separates the image/voice multiplexed data that was read from the recording medium 309 into image data and voice data, and outputs each data.

Next, the control method of the recording area by the access area management unit 1902 will be described.

Figure 3:
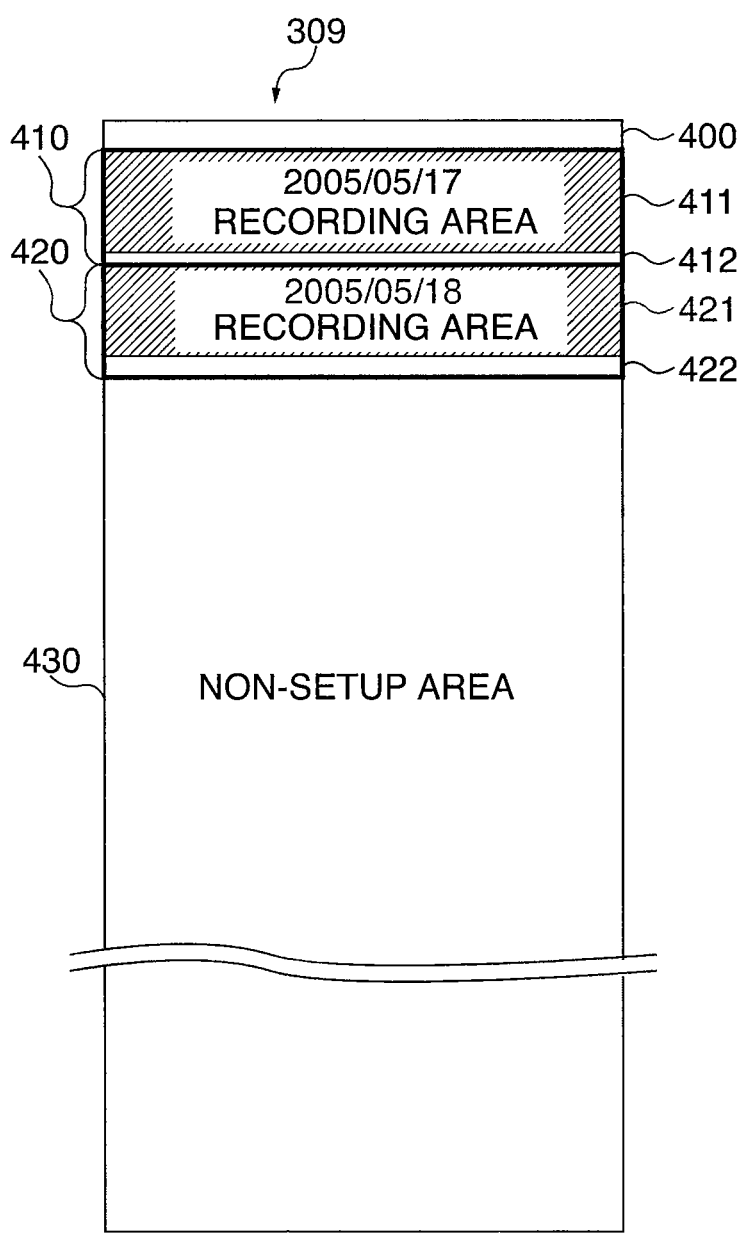
FIG. 3 is a diagram showing a recording area that is set on a recording medium in FIG. 1.

FIG. 3 is a diagram showing a recording area that is set on the recording medium 309 in FIG. 1.

In FIG. 3, an area 400 is an area in which management data, which is generated by the management data generation unit 1903 and manages the entire recording medium 309, is stored. Areas 410 and 420 are divided and setup recording areas (hereinafter referred to as a "divided area"). The areas 410 and 420 are areas on which the recording setting for data is set by user operation, and data is written based on the setting. The details of the setting will be described later. An area 430 is a non-setup area on the recording medium 309.

Areas 411 and 421 are recorded areas in the divided recording areas. Areas 412 and 422 are non-recorded areas in the divided recording areas.

Next, a display screen displayed on the display unit 306 when the user sets recording areas on the recording medium 309 will be described with reference to FIG. 4. In the present embodiment, how to use the recording areas of the recording medium 309 can be set by user operation.

Figure 4:
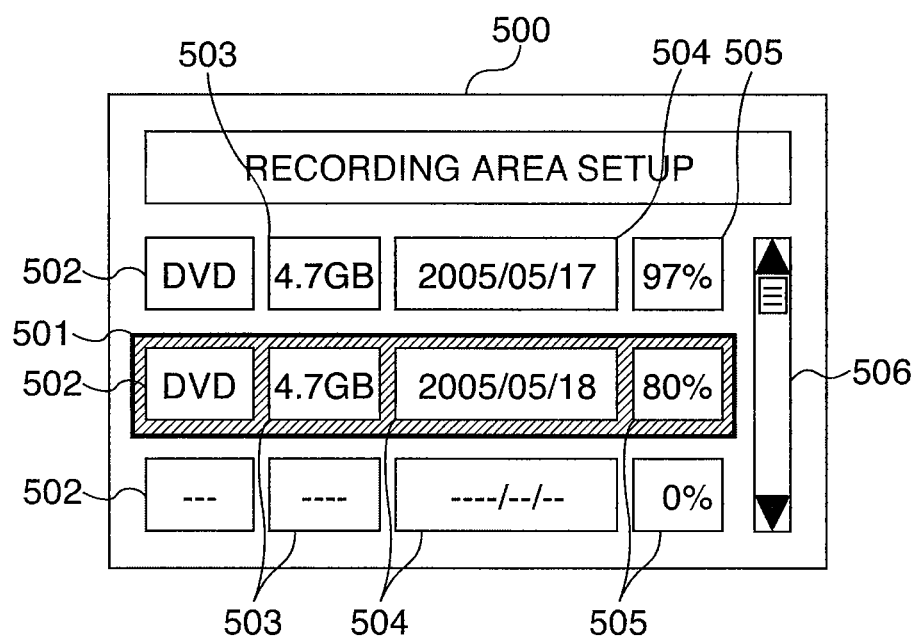
FIG. 4 is a diagram showing an example of a recording area setup screen, which is displayed on a display unit in FIG. 1 during the setting of the recording area by a user.

FIG. 4 is a diagram showing an example of a recording area setup screen, which is displayed on a display unit 306 in FIG. 1 during the setting of the recording area by a user.

In FIG. 4, a recording area setup screen 500 is displayed on the display unit 306 by the display control unit 307. On the recording area setup screen 500, the setting of the recording areas corresponding to the above described areas 410 and 420 is displayed.

Display items 502 on the recording area setup screen 500 represent the recording format of the recording areas. For example, when the display item 502 is set as "DVD", this means that image/voice multiplexed data to be recorded on the recording area is recorded in a DVD format. Note that although "DVD" is displayed in the display item 502, the display item is not limited thereto, and "DVD-VIDEO", "DVD-VR" or the like may be displayed; the format displayed in each of the display item 502 may also be selectable from among these.

Display items 503 represent the recording capacity of the recording areas. For example, when the display item 503 is set as "4.7 GB", this means that a 4.7 GB recording area is reserved on the recording medium 309.

Display items 504 represent the shooting date and time of the image/voice multiplexed data that are to be recorded on the recording areas. Note that a shooting period or recording date and time may be displayed on the display item 504, in addition to the shooting date and time; the items displayed in each of the display item 504 may also be selectable from among these. Display items 505 represent the recorded capacity of the recording areas.

A selector 501 is a display frame for identifying a recording area selected by the user. The image data is recorded on the recording area selected by the selector 501. Note that, in regard to recording on the recording area where recorded areas exist, whether to overwrite or not may be selectable.

Figure 5A:
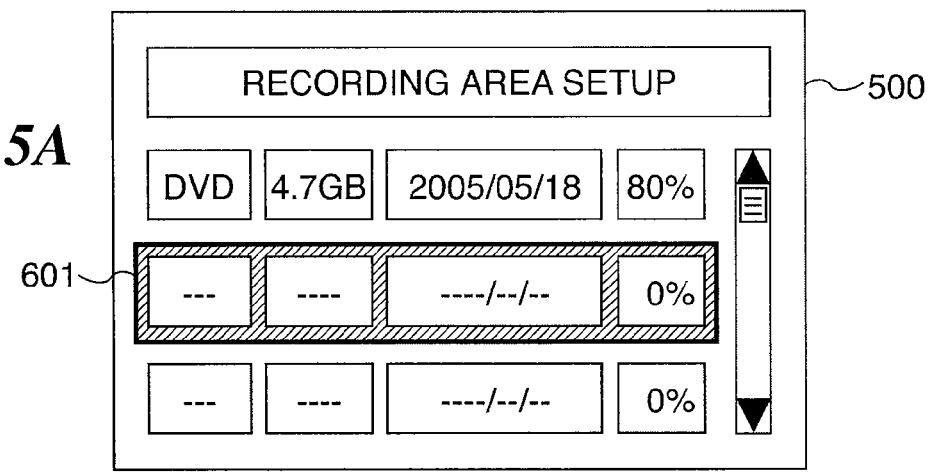
FIGS. 5A to 5C are diagrams showing examples of recording area setup screens that are displayed during the setting of a new recording area, FIG. 5A showing the screen during selection with a selector, FIG. 5B showing the screen during the setting of various information of the recording area, and FIG. 5C showing the screen when the setting is completed.
Figure 5B:
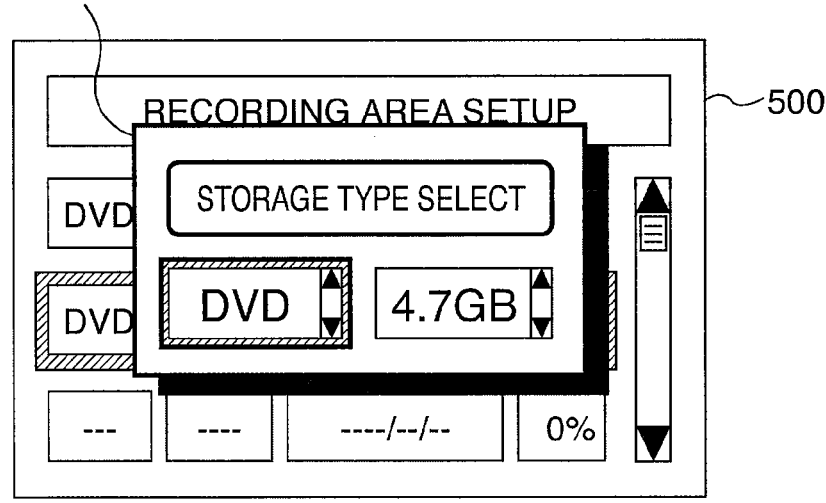
Figure 5C:
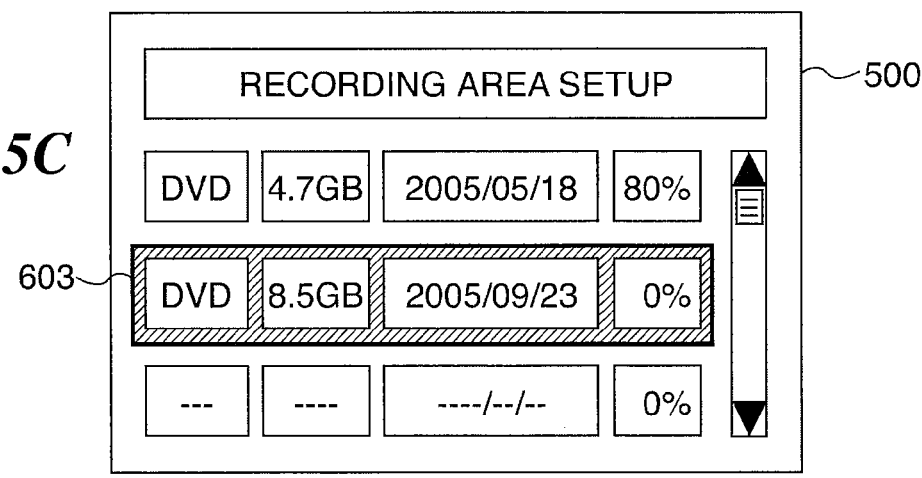

FIGS. 5A to 5C are diagrams showing examples of recording area setup screens 500 that are displayed on the display unit 306 during the setting of a new recording area by user operation. FIG. 6 is a diagram showing a recording area newly set on the recording medium 309.

The user uses the selector 501 to select a new recording area 601 on the recording area setup screen 500 (FIG. 5A), and sets the detailed setting of the recording area 601 on a dialog 602 (FIG. 5B). This allows a new recording area 603 for recording image data to be set as shown in FIG. 5C, therefore, a new recording area is reserved on the recording medium 309 based on the detailed setting.

The new recording area, which is set in this manner, is reserved as an area 701 as shown in FIG. 6, for example. As shown in FIG. 5, the image/voice multiplexed data is recorded on the area 701 with the area 701 selected.

Figure 7:
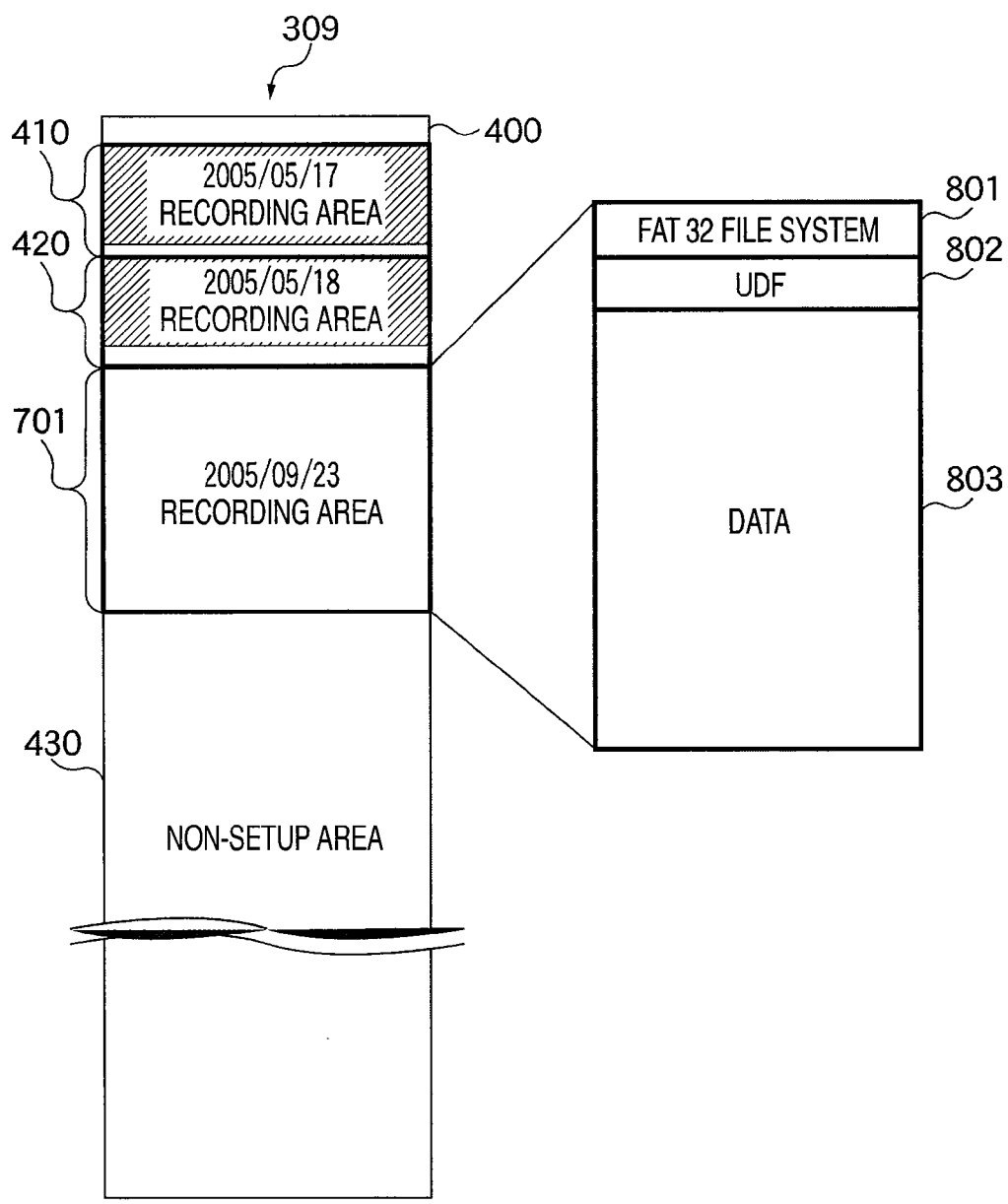
FIG. 7 is a diagram showing the configuration of the recording area that is set on the recording medium on the recording area setup screen shown in FIG. 5.

FIG. 7 is a diagram showing the configuration of the recording area that is set on the recording medium 309 on the recording area setup screen shown in FIG. 5.

In FIG. 7, areas 410, 420 and 701 are divided areas on the recording medium 309 divided by each recording date and time, and the recording position of data in each divided area is managed by an FAT 32 file system. The configuration of each divided area will be described below by taking the area (divided area) 701 as an example. An FAT 32 file system is stored in an area 801 in a management area in the divided area 701 for managing only the divided area 701. Further, an area 802 for storing a UDF file system as a sub file system exists in the management area in the divided area 701. A data area 803 for storing actual data also exists in the divided area 701.

Note that although an FAT file system is a publicly known file system, the file system is not limited thereto, and another type of file system, which can manage the recording position of the large-capacity recording medium, may be used.

Figure 8:
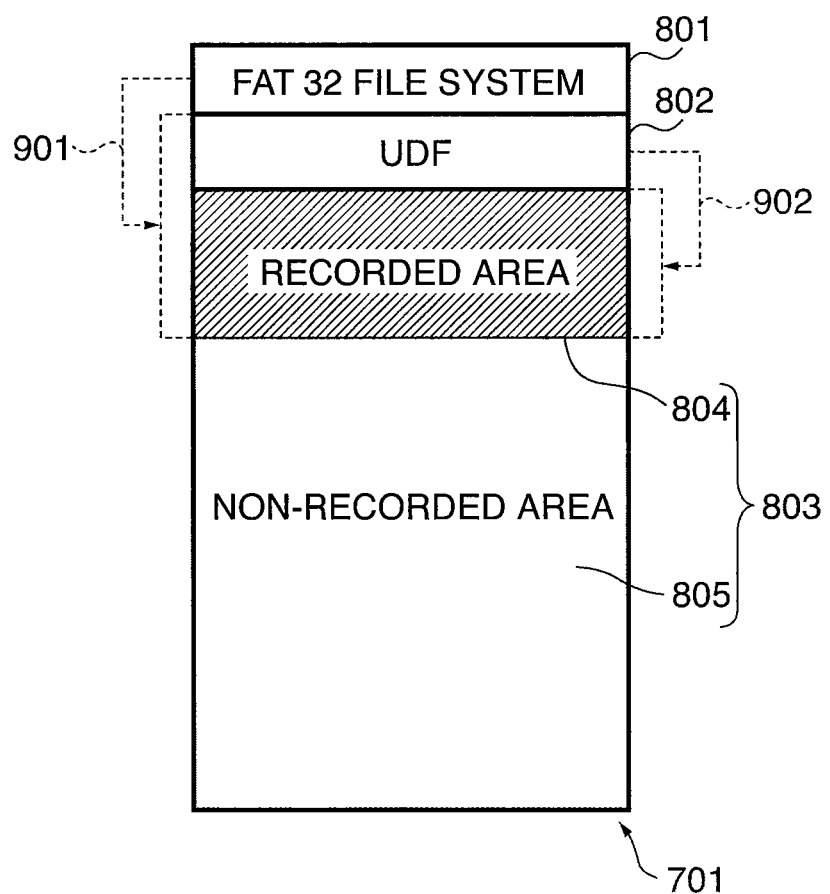
FIG. 8 is a diagram showing the relationship between actual data recorded on a divided area and an FAT 32 file system and a UDF file system which manage the actual data.

FIG. 8 is a diagram showing the relationship between actual data recorded on the divided area 701, and an FAT 32 file system and a UDF file system which manage the actual data.

In FIG. 8, the FAT 32 file system stored in the area 801 in the divided area 701 manages as one file the UDF file system stored in the area 802 in the divided area 701 and the actual data stored in the recorded area 804 in the data area 803 (see dotted arrow 901).

On the other hand, the UDF file system stored in the area 802 manages only the recorded area 804 in the divided area 701 (see dotted arrow 902). The reason why the UDF file system is used here is that the recording format of the actual data on the divided area 701 is set as DVD on the recording area setup screen 500 of FIG. 5. That is to say, a file system of UDF is used during recording on DVD, therefore, image data as actual data has to be managed by the UDF file system. Note that, when another recording format is set on the recording area setup screen 500 of FIG. 4, a file system corresponding to the recording format is used. Management data for each of these file systems and recording formats is generated by a management data generation unit 1903 and recorded on a storage unit 309. Note that data associating a file system with a recording format may be pre-stored in the internal memory 311.

Next, a method for converting a logical address on the recording medium 309 into a virtual logical address in each divided area when the image data is recorded or read as actual data will be described with reference to FIG. 9.

Figure 9:
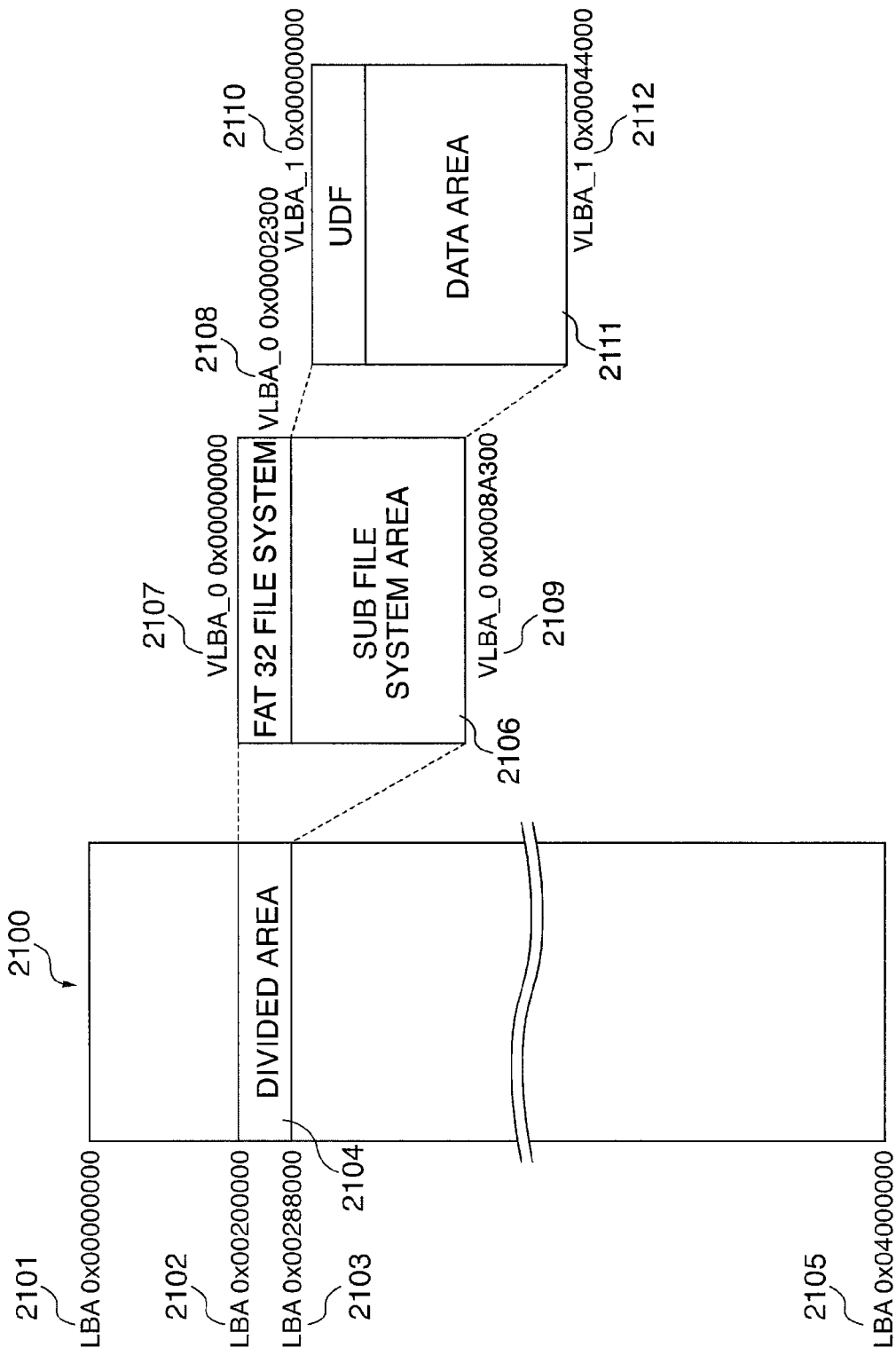
FIG. 9 is a diagram used for explaining a method for converting a logical address on the recording medium into a virtual logical address in each divided area.

FIG. 9 is a diagram used for explaining a method for converting a logical address on the recording medium 309 into a virtual logical address in each divided area.

In FIG. 9, reference numeral 2100 denotes the entire area of the recording medium 309, reference numeral 2104 denotes a divided area, reference numeral 2106 denotes a sub file system area and reference numeral 2111 denotes a data area.

The logical address of the entire area 2100 ranges from LBA0x00000000 (2101) to LBA0x04000000 (2105). The logical address of the divided area 2104 ranges from LBA0x00200000 (2102) to LBA0x00288000 (2103), for example.

The FAT 32 file system in the divided area 2104 manages as a virtual logical address a range from VLBA_0 0x00000000 (2107) to VLBA_0 0x0008A300 (2109).

The sub file system area 2106 in the divided area 2104 is managed over a range from the virtual logical address VLBA_0 0x00002300 (2108) to VLBA_0 0x0008A300 (2109) in the FAT 32 file system in the divided area 2104. Further, the UDF file system in the divided area 2104 manages a range from a virtual sub logical address VLBA_1 0x00000000 (2110) to VLBA_1 0x00044000 (2112). Based on such a relationship, the access area management unit 1902 (FIG. 2) writes/reads data to/from each divided area.

Next, an area 400 on which information for managing the entire configuration of the above described recording medium 309 (management data) is recorded will be described in details.

Figure 10:
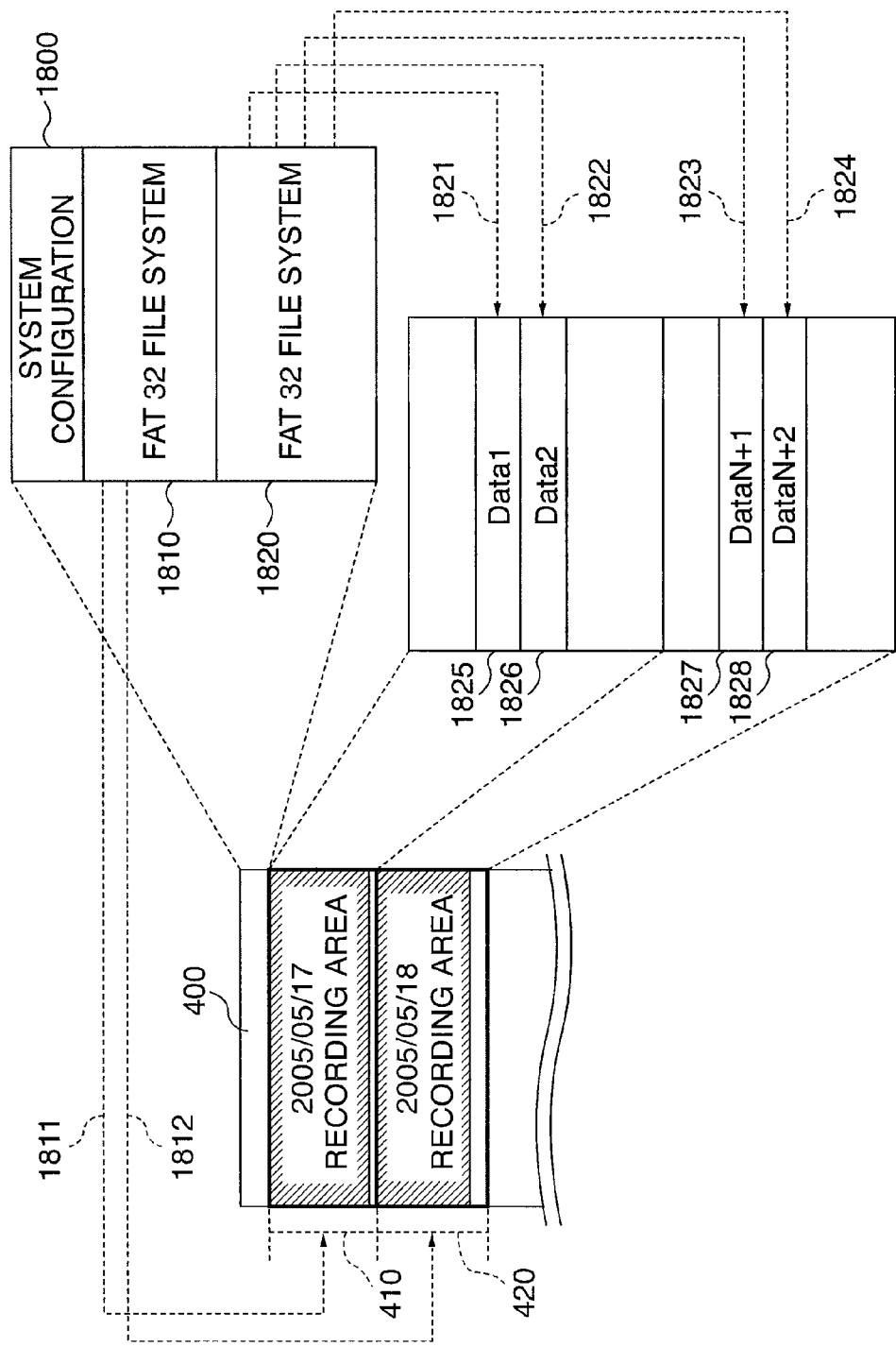
FIG. 10 is a diagram showing the details of an area on which management data for the recording medium is recorded.

FIG. 10 is a diagram showing the details of an area 400 on which management data for the recording medium 309 is recorded.

In FIG. 10, the area 400 is divided into three areas; a system configuration area 1800 for storing system configuration and areas 1810 and 1820 for storing a FAT 32 file system.

The information indicating the sub file system of each divided area on the recording medium 309 and the information on the currently selected divided area for recording are stored in the system configuration area 1800. The details of the information stored in the system configuration area 1800 is shown in FIG. 11.

Figure 11:
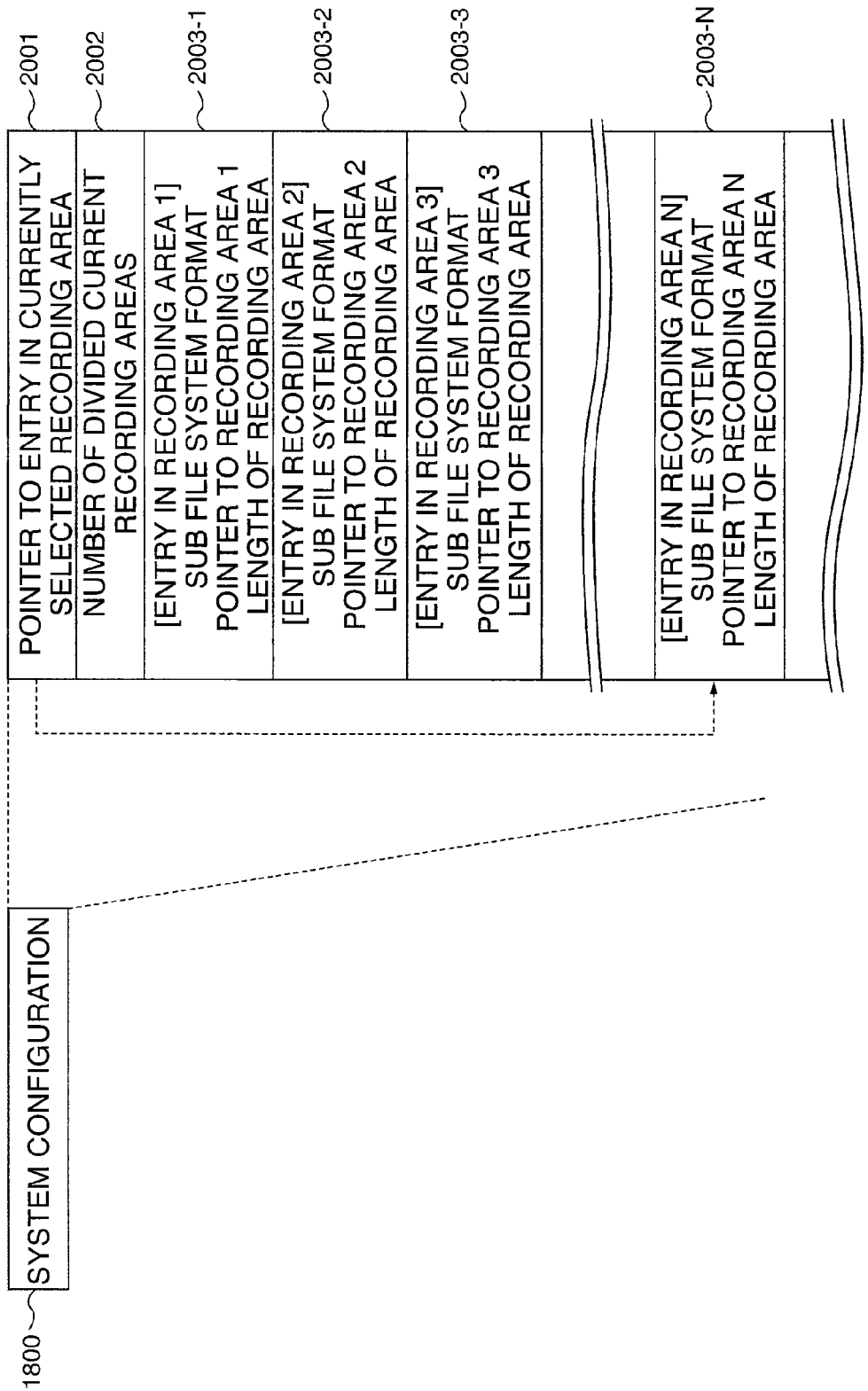
FIG. 11 is a diagram showing the details of information stored in a system configuration area in FIG. 10.

In FIG. 11, at least a pointer 2001 to an entry in a currently selected recording area, the number of divided current recording areas 2002 and entries 2003_1 to 2003_N in each recording area divided into N are stored in the system configuration area 1800. In each of entries 2003_1 to 2003_N, a pointer to each recording area, the format of the sub file system of each recording area and information indicating the length of the recording area are stored, respectively.

Returning to FIG. 10, the FAT 32 file system stored in the area 1810 manages the entire recording medium 309 by taking each divided area as one file. For example, entries 1811 and 1812 representing the divided recording areas 410 and 420 are managed by the FAT 32 file system stored in the area 1810.

The FAT 32 file system stored in the area 1820 manages each data recorded on each divided area as one file. For example, entries 1821 and 1822 representing image data (Data 1) (hereinafter simply referred to as image data 1825) recorded on the area 1825 in the divided recording area 410 and image data 1826 (Data 2) are managed by the FAT 32 file system stored in the area 1820. Further, entries 1823 and 1824 representing image data 1827 (Data N+1) and 1828 (Data N+2) recorded on the divided recording area 420 are managed by the FAT 32 file system stored in the area 1820. Note that, as described above, these file systems stored in the areas 1810 and 1820 are not limited to a FAT 32 file system, and a file system in another format may be used.

Next, operation processing during shooting with the digital video camera 100 will be described with reference to FIG. 12.

Figure 12:
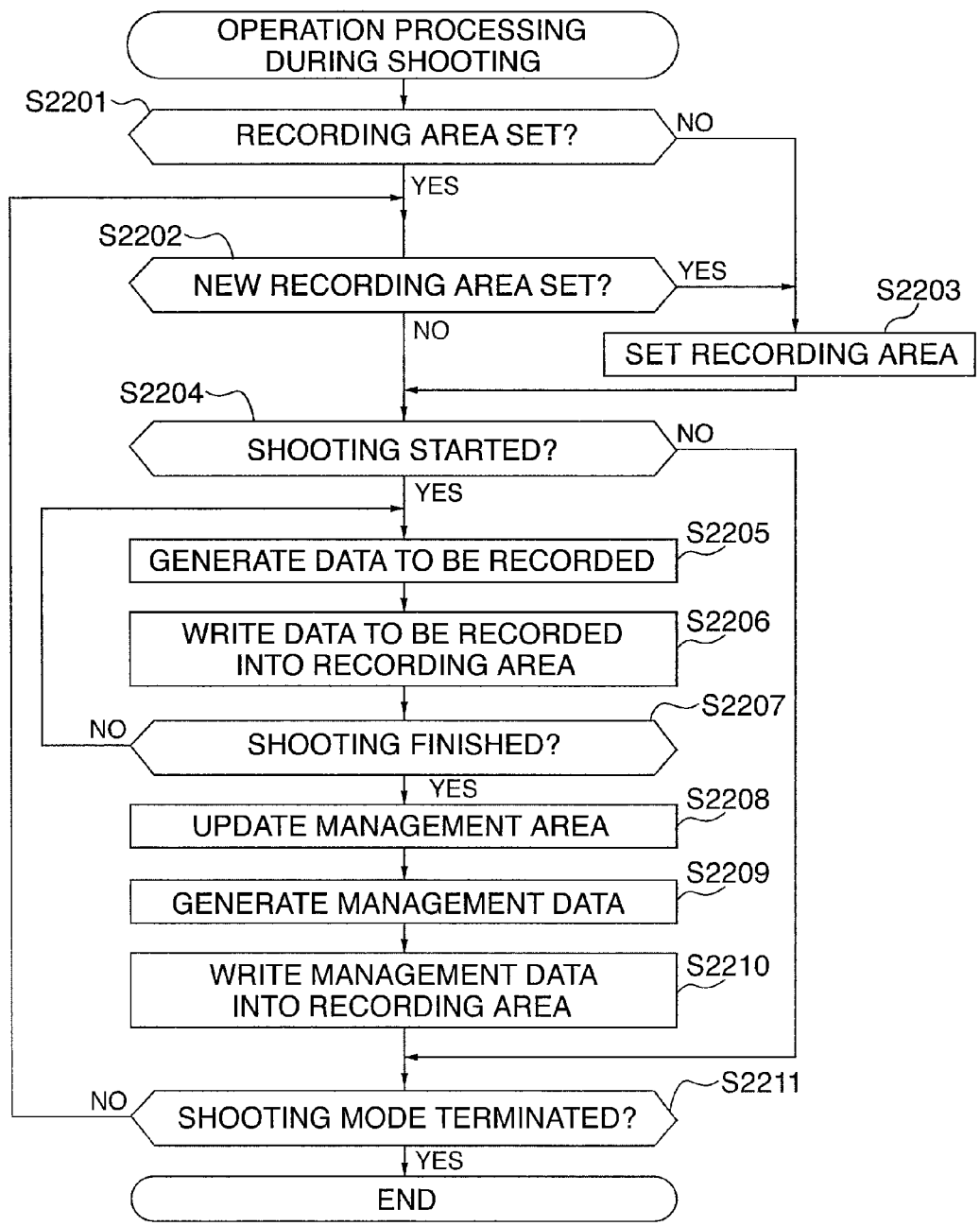
FIG. 12 is a flowchart showing the procedure of the operation processing during shooting with the digital video camera of FIG. 1.

FIG. 12 is a flowchart showing the procedure of the operation processing during shooting with the digital video camera 100 of FIG. 1. This processing is control processing performed based on a program read from the internal memory 311 or the like by the main control unit 303.

In FIG. 12, when a shooting mode starts, the main control unit 303 judges whether or not a recording area such as the recording area 701 shown in FIG. 6, which is set to record image data on the recording medium 309, has been set (Step S2201). As a result, if setting has not been made, the process proceeds to Step S2203. In Step S2203, the main control unit 303 prompts the user to set a recording area. The setting of the recording area is made on the recording area setup screen 500 shown in FIGS. 5A to 5C.

When the setting of the recording area is made according to user operation, each information, which was set, is stored in the system configuration area 1800 in the area 400 shown in FIG. 10. Here, the pointer 2001 to an entry in the currently selected recording area, the number of divided current recording areas 2002 and the entries 2003 in the each recording area are updated, respectively.

As a result of the judgment in Step S2201, when a recording area is set, the main control unit 303 judges whether or not a new recording area is set (Step S2202). More specifically, the judgment is performed depending on whether or not the user set a new recording area through the input unit 304. As a result, when the user set a new recording area through the input unit 304, the process proceeds to Step S2203, on the other hand, when the user did not set a new recording area, the process proceeds to Step S2204.

In Step S2204, whether or not a request to start shooting was made by the user through the input unit 304 is verified by the input operation control unit 305. As a result, when a request to start shooting was made, shooting is started (YES in Step S2204), and the process proceeds to Step S2205. On the other hand, when a request to start shooting was not made, the process proceeds to Step S2211.

In Step S2205, image data shot by the image pickup control unit 302 is compressed and processed by the image processing unit 312, and transferred to the recording/reproduction control unit 310 through the internal memory 311. Then, data to be recorded (image data), which is multiplexed by the MUX 1905 in the recording/reproduction control unit 310, is generated in the internal memory 311. At that time, when the recording format selected on the display item 502 by the user is DVD, image data as an MPEG2 program stream is generated.

In Step S2206, image data generated in Step S2205 is written into the recording area. That is to say, the digital video camera 100 refers to the address of the currently selected recording area entry presented by the pointer 2001 in the system configuration area 1800. Then, writing into the logical address, which is indicated by the pointer to the current recording area entry, is performed by the access area management unit 1902. At that time, a logical address at which image data should be recorded is determined based on the relationship among the entire area 2100, the divided area 2104 and the sub file system area 2106 shown in FIG. 9.

The processing of steps S2205 to S2206 is repeated until a request to finish shooting is made by the user (YES in Step S2207). On the other hand, if a request to finish shooting is made (NO in Step S2207), in Step S2208, the system control unit 303 updates management areas, in which the FAT 32 file system (the area 801 shown in FIG. 7) and the UDF file system (the area 802 shown in FIG. 7) are stored.

Next, in Step S2209, management information (management data) associated with the recorded image data is generated. The management data is information such as "VIDEO_TS.IFO" and "VTS_##_#.IFO" if a recording format is DVD, for example.

Next, in Step S2210, the management data generated in Step S2209 is recorded on a predetermined recording area specified by a DVD specification in the divided area.

In Step S2211, the system control unit 303 judges whether or not the shooting mode is terminated, and if the shooting mode is not terminated but continued (NO in Step S2211), the process returns to Step S2202. On the other hand, if the shooting mode is terminated (Yes in Step S2211), the present process is terminated.

The above processing allows the image data shot by the digital video camera 100 to be recorded on the recording medium 309.

Next, operation processing when the digital video camera 100 is connected to external device will be described.

Figure 13:
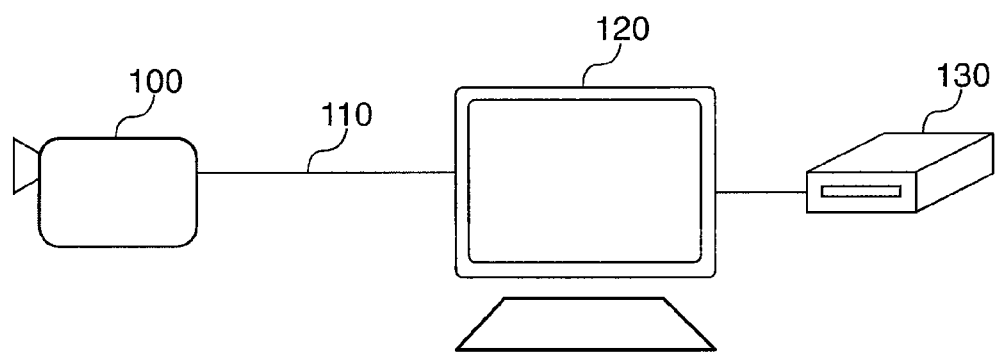
FIG. 13 is a diagram showing an example of the digital video camera connected to external devices.

FIG. 13 is a diagram showing an example of the digital video camera 100 connected to external device.

In FIG. 13, the digital video camera 100 is connected to the PC 120 as external device through a USB cable 110. A DVD drive 130 is connected to (or embedded in) a PC 120. Note that although a protocol on the USB is a mass storage protocol, since the protocol is publicly known, the description is omitted.

The image data is already recorded on the recording medium 309 in the digital video camera 100 in the above manner. On the connection mode setup screen shown in FIG. 14 displayed on the display unit 306 of the digital video camera 100, the user can set which image data among the image data recorded on the recording medium 309 is to be exposed onto the PC 120, that is to say, which image data is made accessible to the PC 120.

Figure 14:
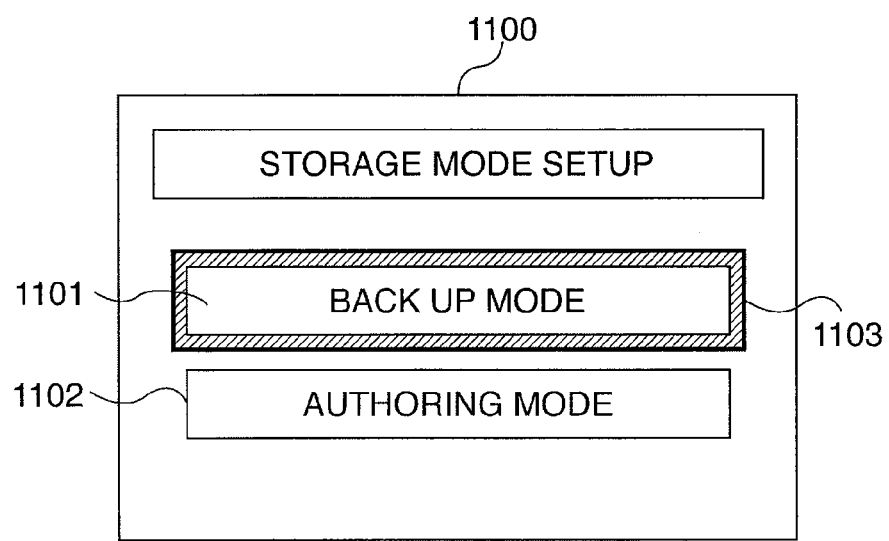
FIG. 14 is a diagram showing an example of a connection mode setup screen, which is displayed during the setting of a connection mode for a PC of FIG. 13.

FIG. 14 is a diagram showing an example of a connection mode setup screen, which is displayed during the setting of a connection mode for the PC 120 of FIG. 13.

In FIG. 14, a connection mode setup screen 1100 is displayed on the display unit 306 of the digital video camera 100 by the display control unit 307. On the connection mode setup screen 1100, a selector 1103 can be used to select a backup mode 1101 or an authoring mode 1102.

Figure 15:
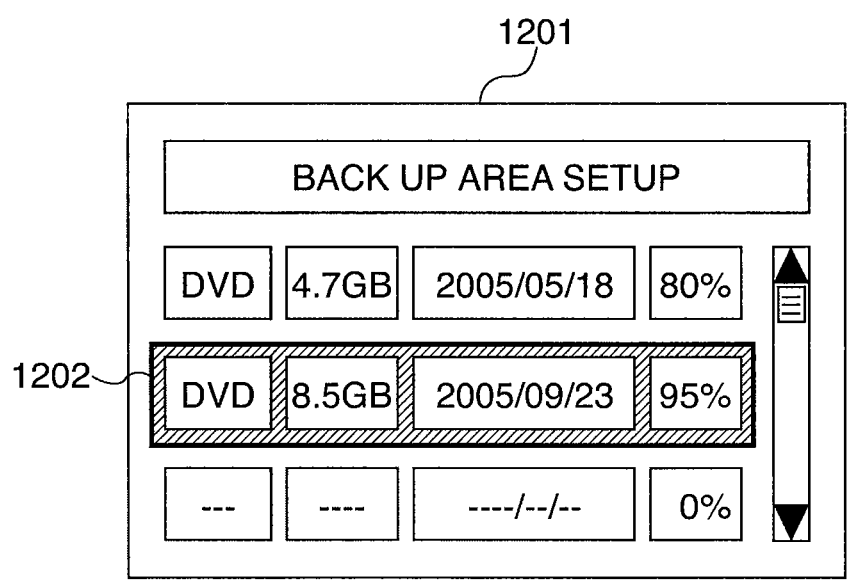
FIG. 15 is a diagram showing an example of a public area selection screen displayed on a display unit when a mode is selected in the connection mode.

On the connection mode setup screen 1100, when the user operates the selector 1103 with the input unit 304 to select the backup mode 1101, the display control unit 307 displays on the display unit 306 a public area selection screen 1201 shown in FIG. 15.

The user can select the recording area that the user wishes to expose onto the PC 120 on the public area selection screen 1201. In the present embodiment, it is assumed that a recording area 1202 is selected, for example.

When the backup mode 1101 is selected, only the divided area 2104 shown in FIG. 9 is exposed onto the PC 120. Here, the details of the recording area exposed onto the PC 120 is shown in FIG. 16.

Figure 16:
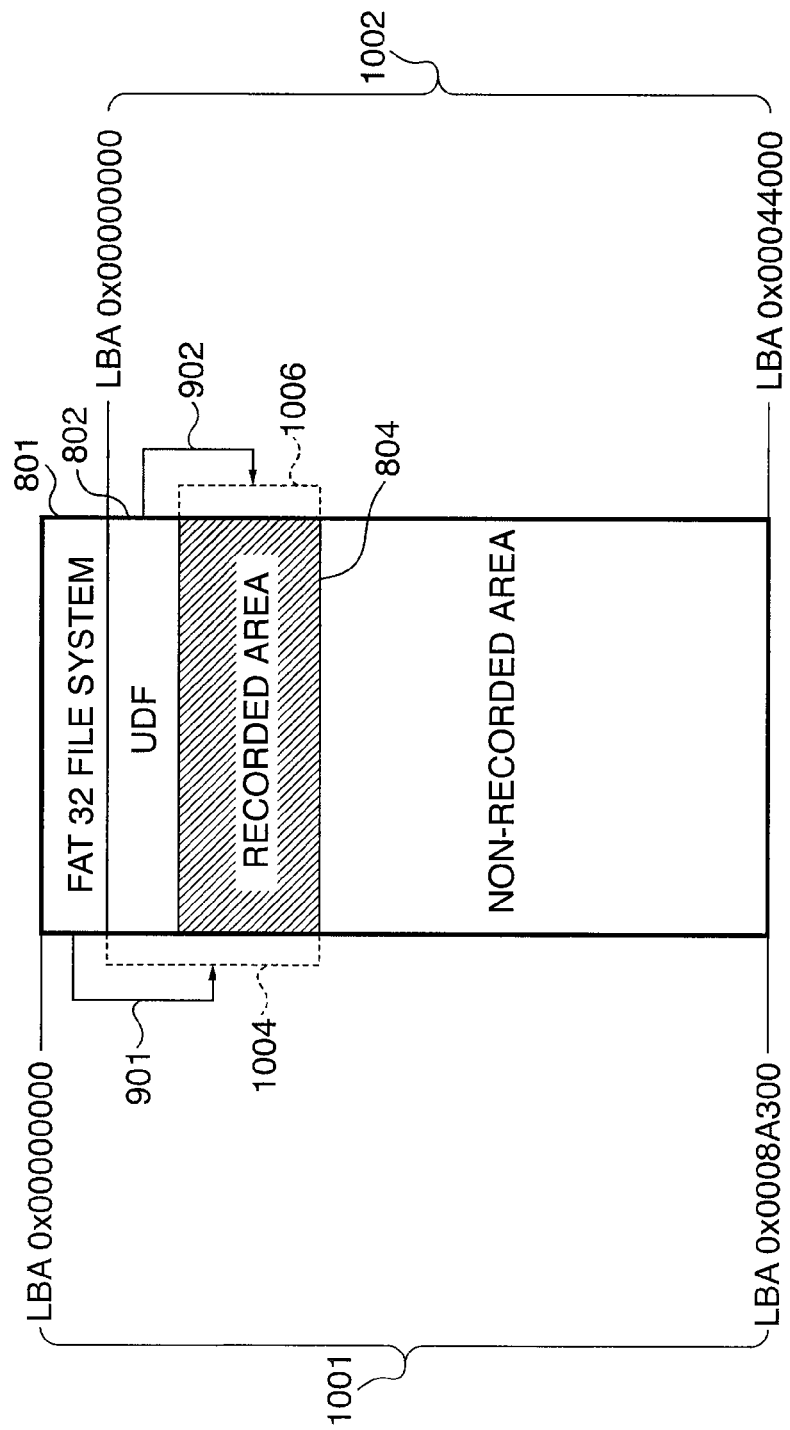
FIG. 16 is a diagram showing the details of the recording area exposed onto the PC.

In FIG. 16, a divided area 2104 is exposed on a public area 1001. The digital video camera 100 exposes in the public area 1001 the head address of the divided area such as the logical address LBA0x00000000, allowing the PC 120 to access only the divided area 2104.

Here, the public area 1001 is managed by the FAT 32 file system stored in the area 801. Then, the FAT 32 file system manages as one file the area 802 in which the UDF that is the above described sub file system is stored, and the recorded area 804 in which the actual data is stored (see solid arrow 901). That is to say, in this state, the PC 120 recognizes the digital video camera 100 as a recording device on which only one data file is recorded.

Figure 17:
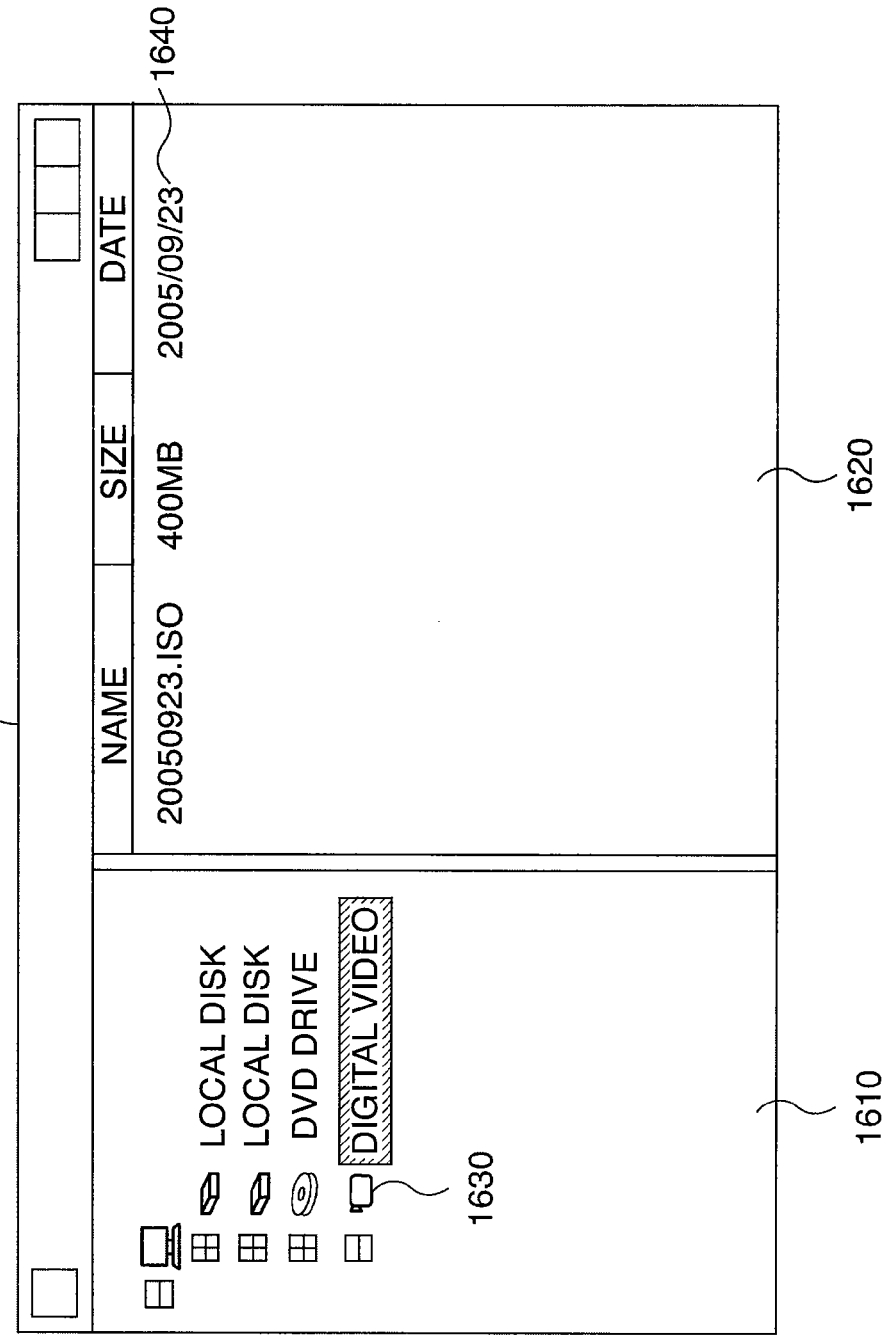
FIG. 17 is a diagram showing an example of a browser displayed on the PC as a result of exposure of the recording area onto the PC.

FIG. 17 is a diagram showing an example of a browser displayed on the PC 120 as a result of exposure of the recording area onto the PC 120.

In FIG. 17, a browser 1600 is a screen displayed by an application running on the PC 120. A list of the recording devises that are connected to or embedded in the PC 120 is displayed on the display area 1610 on the browser 1600. On the display area 1610, the digital video camera 100 is displayed as one (icon 1630) of the recording devices that are connected to the PC 120. Then, when the icon 1630 is selected, among data recorded on the recording medium 309 in the digital video camera 100, image data recorded on the divided area that was selected on the public area selection screen 1201 in advance is displayed on the display area 1620.

The image data displayed on the display area 1620 is only a file 1640, for example, named "20050923.ISO", which is handled as an ISO image. The file 1640 represents the area 1004 in FIG. 16. The ISO image is used when data is recorded as is on an optical disk such as a CD or a DVD. In this state, a common copy application running on the PC 120 allows data to be duplicated easily using the ISO image data.

Figure 18:
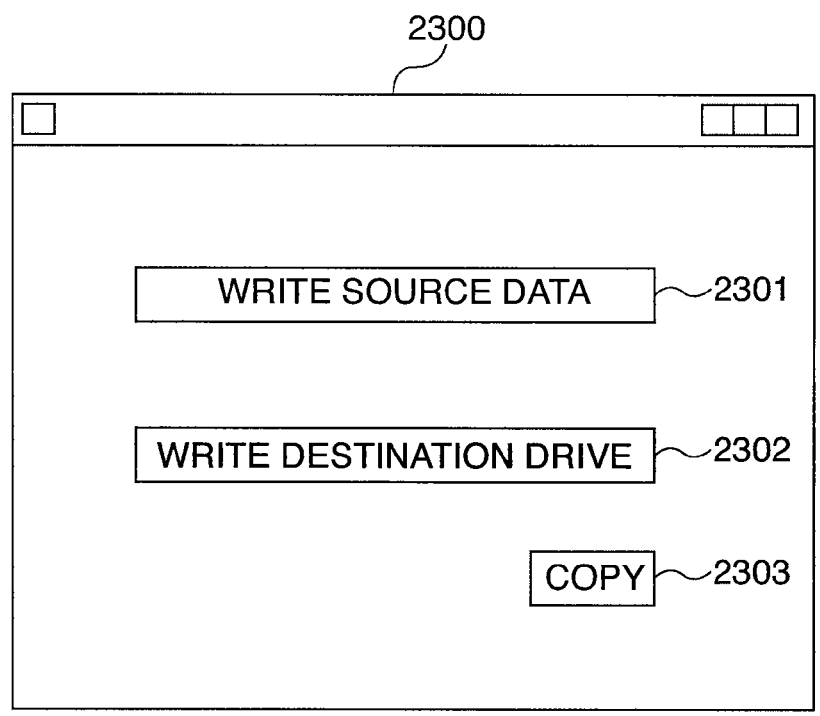
FIG. 18 is a diagram showing an example of a display screen displayed by a copy application running on the PC.

An example of a display screen displayed by a copy application running on the PC 120 is shown in FIG. 18.

In FIG. 18, a display screen 2300 is a screen displayed on the PC 120 when the copy application, which performs recording on CDs or DVDS, executes on the PC 120. On the display screen 2300, the user presses a write source data button 2301 and specifies desired ISO image data, then presses a write destination drive button 2302 to select a DVD drive 130. Subsequently, when a copy button 2303 is clicked and pressed, the duplication of the image data recorded on the divided area 2104 shown in FIG. 9 can be easily written into the DVD.

In addition, the user can select a plurality of recording areas that the user wishes to expose onto the PC 120 on the public area selection screen 1201. A public area selection screen displayed when a plurality of recording areas to be exposed are selected is shown in FIG. 19.

Figure 19:
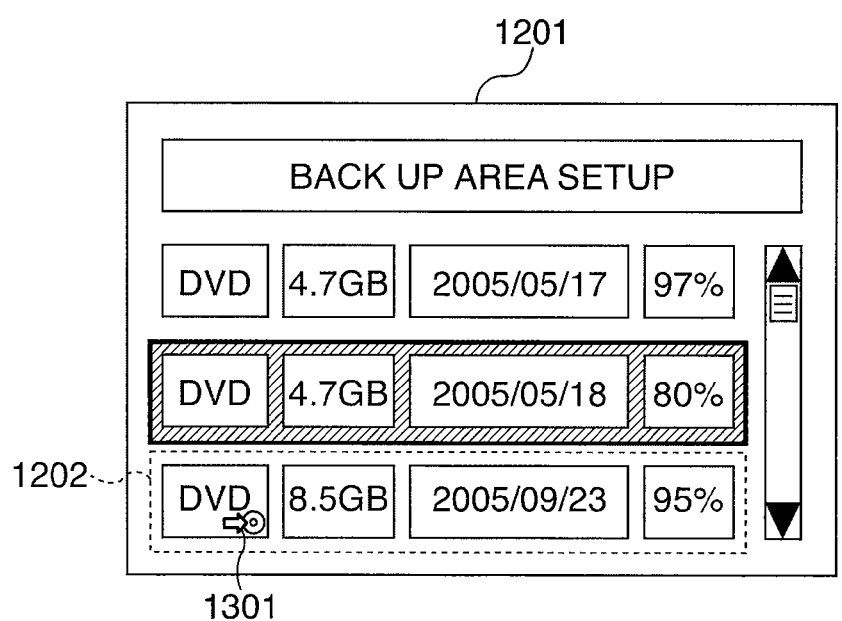
FIG. 19 is a diagram showing an example of a public area selection screen displayed when a plurality of recording areas to be exposed are selected.

In FIG. 19, a selection icon 1301 is displayed on the recording area selected as an area for exposure on the public area selection screen 1201. In this case, an area managed by the FAT 32 file system, which is stored in the area 1810 in FIG. 10, is exposed onto the PC 120. Therefore, the PC 120 recognizes as a logical address 0 the head of the area 1810 in which the FAT 32 file system is stored. At that time, the FAT 32 file system stored in the area 1810 is adapted to manage as a file the recording areas selected on the public area selection screen 1201 of FIG. 19. Further, the entry for the FAT 32 file system stored in the area 1810 is adapted not to indicate the head of a divided area, but to indicate the head of the UDF file system. That is, in the case where the divided area 701 as shown in FIG. 7 is selected as a public area, the entry for the FAT 32 file system stored in the area 1810 does not indicates the head area of the FAT 32 file system stored in the area 801 but indicates the head area of the UDF file system stored in the area 802.

Figure 20:
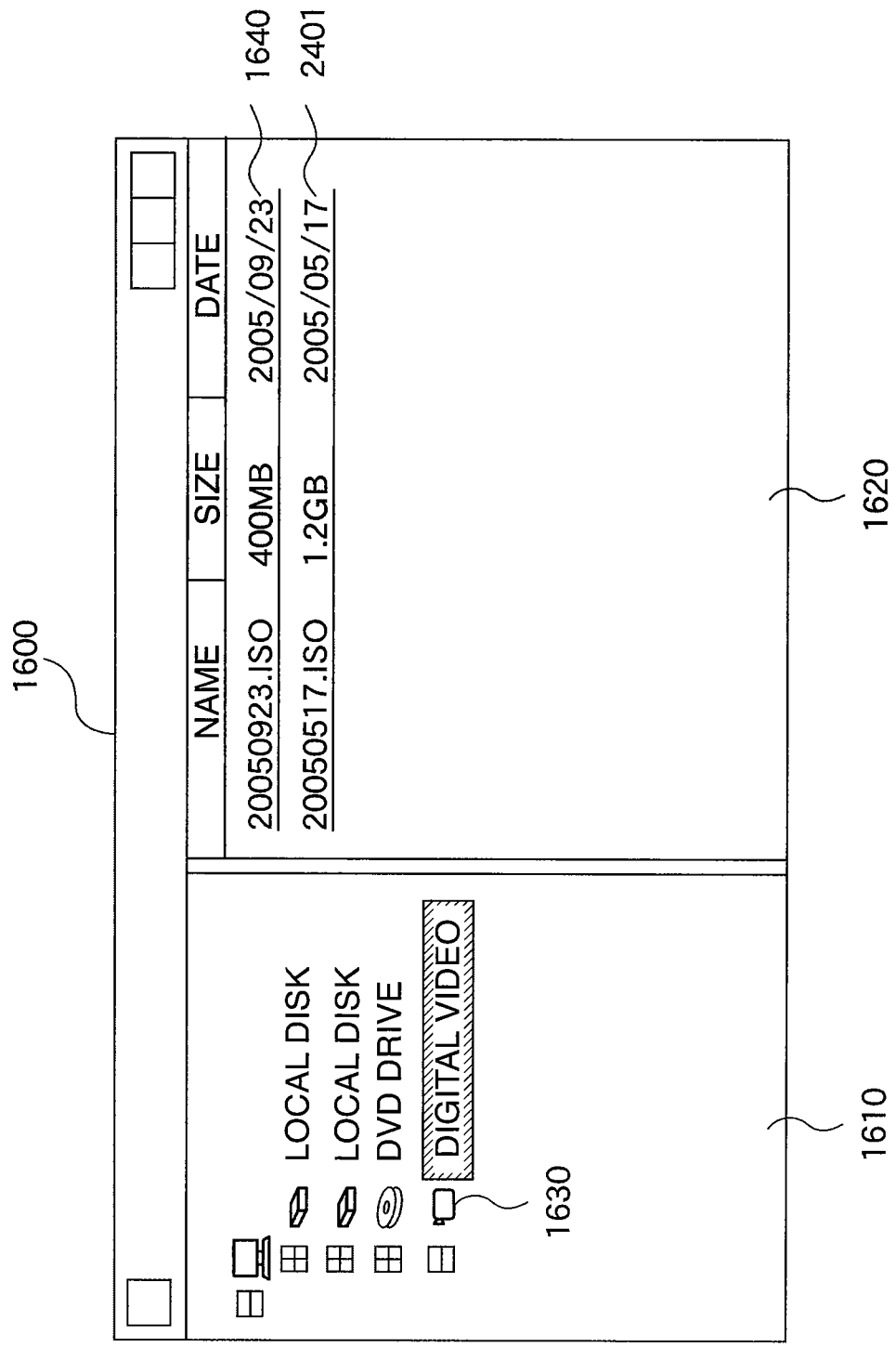
FIG. 20 is a diagram showing an example of a browser displayed on the PC as a result of exposure of multiple selected recording areas.

Then, when two recording areas are selected as areas for exposure by the digital video camera 100, as shown in FIG. 20, two ISO images 1640 and 2401 are displayed on the area 1620 on the browser 1600 on the PC 120. That is to say, the user only needs to set to be exposed onto PC 120, those among the recording areas the user wishes to back up, to be able to activate the copy application to display the display screen shown in FIG. 18, and select and record each ISO image on DVD, allowing the image data to be backed up easily.

Figure 21:
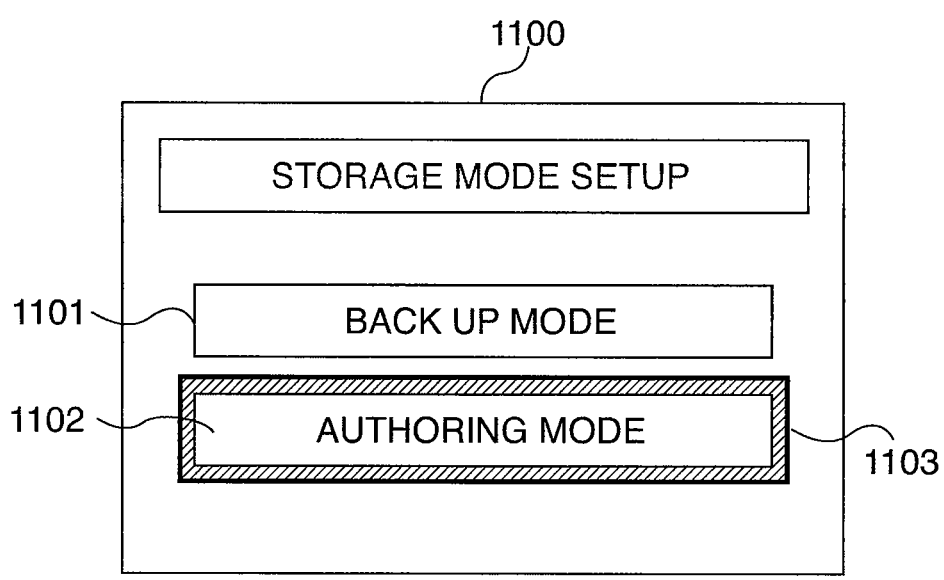
FIG. 21 is a diagram showing an example of a connection mode setup screen during selection of an authorizing mode.
Figure 22:
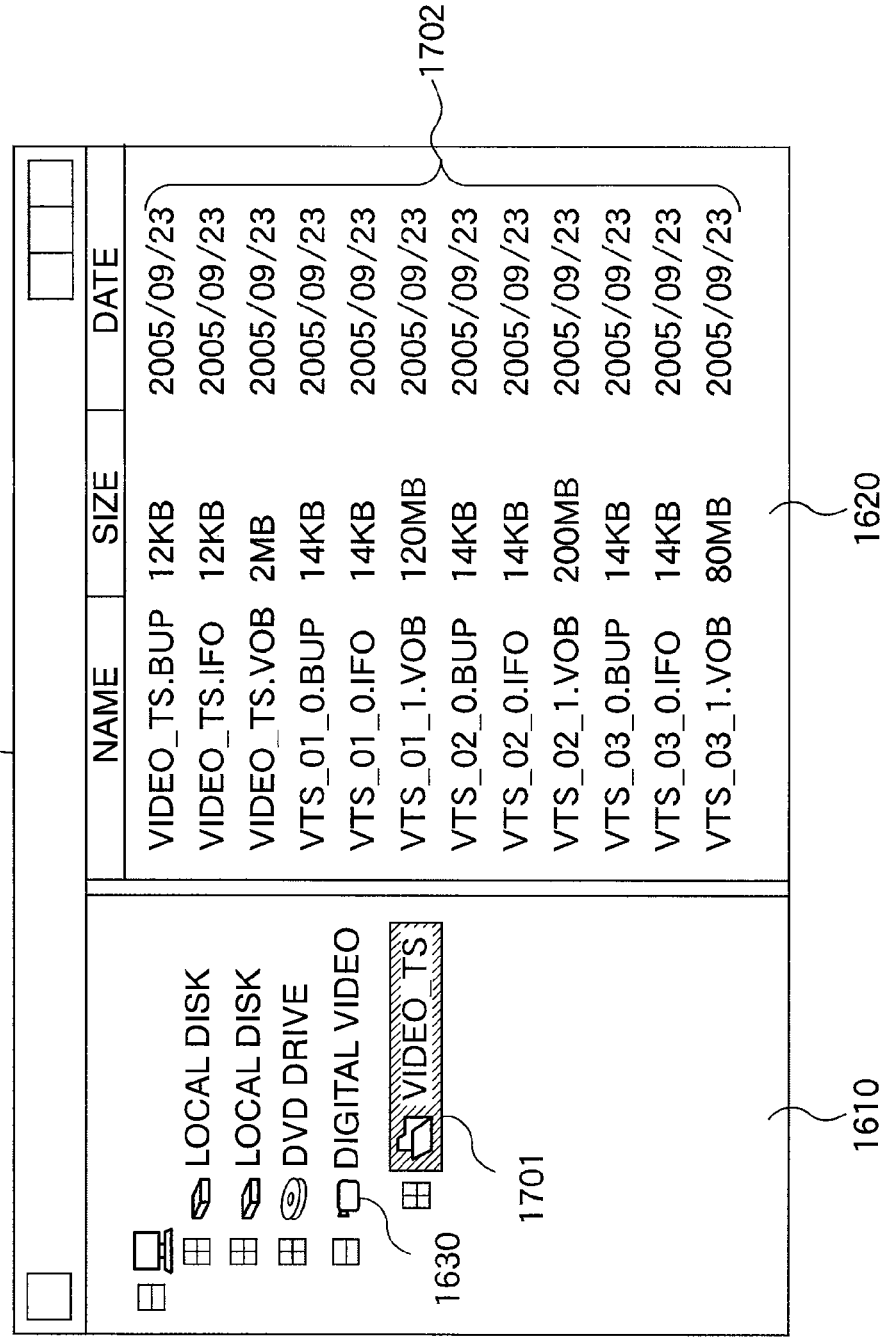
FIG. 22 is a diagram showing an example of a browser displayed on the PC when the authorizing mode is selected.
Figure 23:
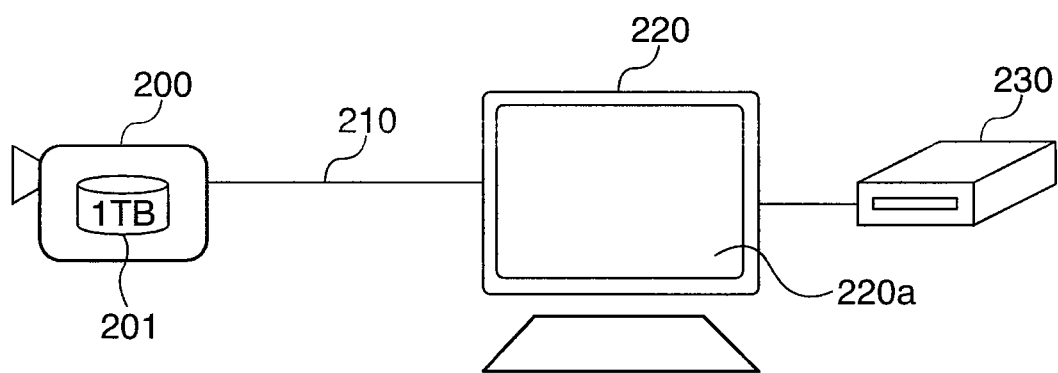
FIG. 23 is a diagram showing an example of a state where a conventional image recording/reproducing apparatus is connected to a PC.
Figure 24:
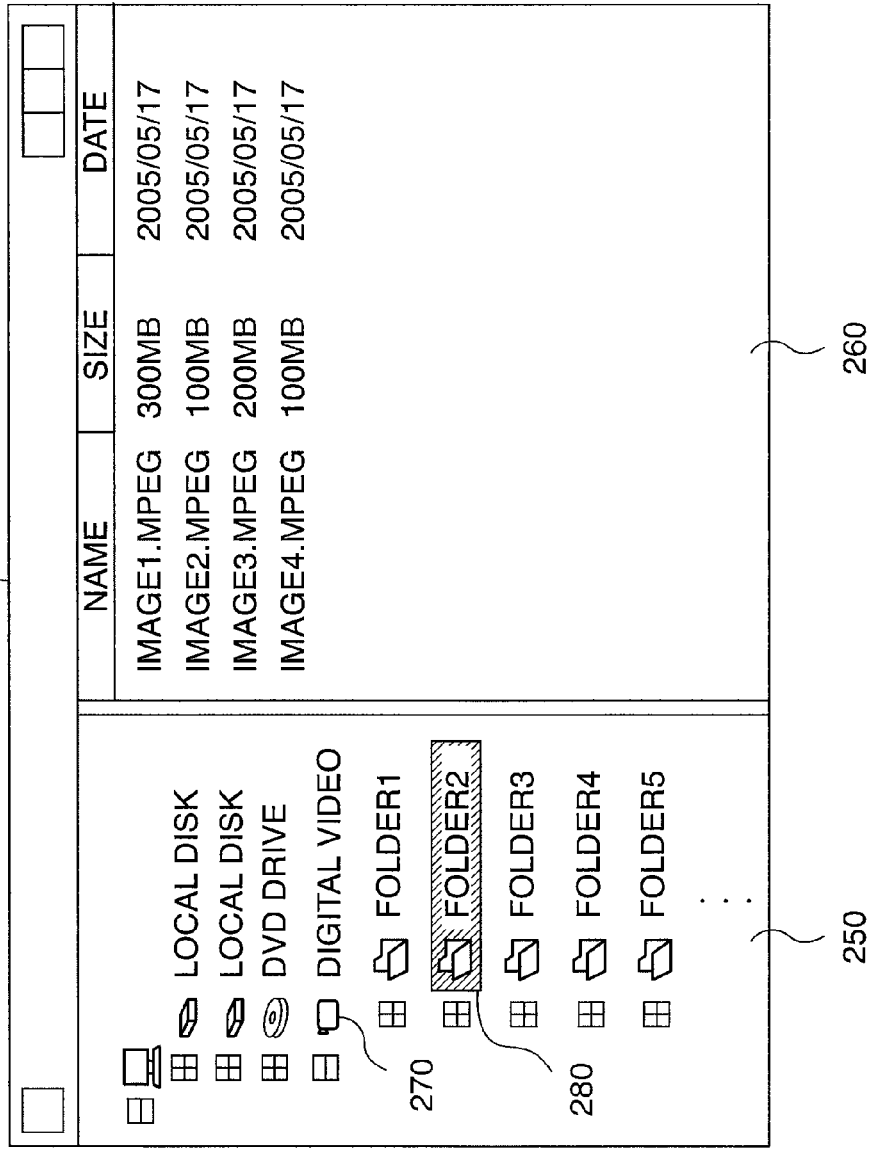
FIG. 24 is a diagram showing an example of a browser displayed on the PC during connection of an image recording/reproducing apparatus.

Meanwhile, as shown in FIG. 21, when an authoring mode 1102 is selected by the selector 1103 on the connection mode setup screen 1100, the area 1102 shown in FIG. 16 is exposed onto the PC 120. That is to say, the PC 120 recognizes the recording medium 309 as a DVD medium. At that time, on the PC 120, a browser 1700 shown in FIG. 22 is displayed.

When the authoring mode 1102 is selected, the digital video camera 100 is recognized as a DVD drive. Then, groups of DVD specification files, which are the contents, are exposed as shown on the display area 1702. In this state, a common DVD editing application and a DVD reproduction application running on the PC 120 allow data to be edited and displayed in addition to backing up data. Such an authoring mode 1102 is provided to improve convenience to the user.

In addition, an area 1820 in which the FAT 32 file system shown in FIG. 10 is stored is exposed to external devices, allowing all the image data to be browsed on the external devices because each of the recorded image data is managed as a file. Further, settings as shown in FIGS. 14 and 15 can be made in order to selectively expose only necessary image data to the external devices.

According to the above embodiment, when the recording area in the recording medium is divided into at least one sub area for management, image data is recorded on the sub area, and the image recording/reproducing apparatus is connected to the external devices, the sub area on which the image data is recorded is selectively exposed to the external devices. This allows a user to perform data transfer easily without the need of searching in a list including vast amounts of data for data that the user wishes to transfer even if a lot of data is stored in the image recording/reproducing apparatus.

According to the above embodiment, the user can divide the recording area on the large-capacity recording medium (recording medium 309) to record image data, allowing the image data to be managed easily. Further, when the image data recorded on the large-capacity recording medium is exposed to external devices through an interface, only necessary image data is exposed as one file with a file system included, allowing backup to be achieved easily. Moreover, if the user wishes to display image data itself, the user can selectively switches modes, allowing to get an access using a user-desired method.

In the above embodiment although a USB is used for the interface, the interface is not limited thereto, and other interfaces may be used. Further, external device is not limited to a PC, and other copying machines, printers, televisions, portable terminals or the like may be used.

Moreover, the recording area to be exposed may be set before or after the connection of the external device. Note that if the setting is made after the connection, when the user moves to a setup screen, the USB interface inputs into a temporary disconnect state, and connection is established again after setting is completed.

Although a case where the present invention is applied to the digital video camera 100 has been described in the above embodiment, the present invention is not limited thereto, and the present invention may be applied to other image recording/reproducing apparatuses and recording devices, such as digital cameras, portable terminals, DVD recorders or the like.

Moreover, the recording medium in the digital video camera 100 only needs to be one having a large storage capacity, such as a hard disk, an optical disk such as a CD-ROM, a CD-R, a CD-RW, a DVD-ROM, a DVD±R, a DVD-RAM and a DVD±RW, a magnetic tape, a nonvolatile memory card or the like.

It is to be understood that the object of the present invention may also be accomplished by supplying a system or an apparatus with a storage medium in which a program code of software which realizes the functions of the above described embodiment is stored. In this case, a computer (or CPU or MPU) of the system or apparatus is caused to read out and execute the program code stored in the storage medium. The program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, DVD-ROM, a DVD±R, a DVD-RAM and a DVD±RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part of all of the actual operations based on instructions of the program code.

Moreover, it is to be understood that the functions the embodiments of described above may be realized not necessarily by causing the computer to read and execute the program code, but alternatively by causing an operating system (OS) running on the computer to perform part or all of the actual processing based on instructions in the program code.

In this case, the program code may be supplied directly from a storage medium on which the program code is stored, or from a computer, database, or the like, not shown, that is connected via the Internet, a commercial network, a local area network, or the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Applications No. 2006-203544, filed Jul. 26, 2006, which is hereby incorporated by reference herein in its entirety.

What is claimed is:

1. A recording apparatus, comprising:
a communication unit that communicates with an external device; and
a control unit that (a) generates divided areas in a storage area of a storage medium, (b) determines which one of a first connection mode and a second connection mode is selected as a selected mode, (c) determines which one of the divided areas is selected as a selected area, (d) performs a process for exposing the selected area to the external device if the first connection mode is selected as the selected mode so that the external device can access to first file system information stored in a first area of the selected area, second file system information stored in a second area of the selected area, and data stored in a third area of the selected area, and (e) performs a process for exposing the selected area to the external device without exposing the first area including the first file system information to the external device if the second connection mode is selected as the selected mode so that the external device can access to the second file system information stored in the second area of the selected area and the data stored in the third area of the selected area,
wherein the first file system information is used to access a file including both the second file system information stored in the second area of the selected area and the data stored in the third area of the selected area, and
wherein the second file system information is used to access the data stored in the third area of the selected area.

2. The recording apparatus according to claim 1, wherein the control unit generates a fourth area, a fifth area, and a sixth area in the storage area, and
wherein the fourth area is used for storing information relating to the divided areas, the fifth area is used for storing third file system information which is used to manage each of the divided areas as a file, and the sixth area is used for storing fourth file system information which is used to manage one or more data stored in the divided areas.

3. The recording apparatus according to claim 1, wherein the recording apparatus is capable of acting as a video camera.

4. The recording apparatus according to claim 1, wherein the recording apparatus is capable of acting as a camera.

5. The recording apparatus according to claim 1, wherein the recording apparatus is capable of acting as a portable device.

6. The recording apparatus according to claim 1, further comprising a display control unit that performs a process for displaying a first user interface to request a user to select one of the first connection mode and the second connection mode as the selected mode, and performs a process for displaying a second user interface to request the user to select one of the divided areas as the selected area.

7. A method comprising:
generating divided areas in a storage area of a storage medium;
determining which one of a first connection mode and a second connection mode is selected as a selected mode;
determining which one of the divided areas is selected as a selected area;
performing a process for exposing the selected area to an external device if the first connection mode is selected as the selected mode so that the external device can access to first file system information stored in a first area of the selected area, second file system information stored in a second area of the selected area, and data stored in a third area of the selected area; and
performing a process for exposing the selected area to the external device without exposing the first area including the first file system information to the external device if the second connection mode is selected as the selected mode so that the external device can access to the second file system information stored in the second area of the selected area and the data stored in the third area of the selected area,
wherein the first file system information is used to access a file including both the second file system information stored in the second area of the selected area and the data stored in the third area of the selected area, and
wherein the second file system information is used to access the data stored in the third area of the selected area.

8. The method according to claim 7, further comprising generating a fourth area, a fifth area, and a sixth area in the storage area,
wherein the fourth area is used for storing information relating to the divided areas, the fifth area is used for storing third file system information which is used to manage each of the divided areas as a file, and the sixth area is used for storing fourth file system information which is used to manage one or more data stored in the divided areas.

9. The method according to claim 7, wherein the method is performed by a recording apparatus, and the recording apparatus is capable of acting as a video camera.

10. The method according to claim 7, wherein the method is performed by a recording apparatus, and the recording apparatus is capable of acting as a camera.

11. The method according to claim 7, wherein the method is performed by a recording apparatus, and the recording apparatus is capable of acting as a portable device.

12. The method according to claim 7, further comprising:
performing a process for displaying a first user interface to request a user to select one of the first connection mode and the second connection mode as the selected mode; and
performing a process for displaying a second user interface to request the user to select one of the divided areas as the selected area.

13. A non-transitory computer-readable storage medium that stores a program for causing a computer to execute a method, the method comprising:
generating divided areas in a storage area of a storage medium;
determining which one of a first connection mode and a second connection mode is selected as a selected mode;

determining which one of the divided areas is selected as a selected area;

performing a process for exposing the selected area to an external device if the first connection mode is selected as the selected mode so that the external device can access to first file system information stored in a first area of the selected area, second file system information stored in a second area of the selected area, and data stored in a third area of the selected area; and performing a process for exposing the selected area to the external device without exposing the first area including the first file system information to the external device if the second connection mode is selected as the selected mode so that the external device can access to the second file system information stored in the second area of the selected area and the data stored in the third area of the selected area, wherein the first file system information is used to access a file including both the second file system information stored in the second area of the selected area and the data stored in the third area of the selected area, and wherein the second file system information is used to access the data stored in the third area of the selected area.

14. The non-transitory computer-readable storage medium according to claim 13, the method further comprising:

performing a process for displaying a first user interface to request a user to select one of the first connection mode and the second connection mode as the selected mode; and performing a process for displaying a second user interface to request the user to select one of the divided areas as the selected area.

* * * * *